(12) United States Patent
Abraham et al.

(10) Patent No.: US 7,691,914 B2
(45) Date of Patent: Apr. 6, 2010

(54) POLYURETHANE FOAMS COMPRISING OLIGOMERIC POLYOLS

(75) Inventors: Timothy W. Abraham, Minnetonka, MN (US); Jack A. Carter, Greensboro, NC (US); Dimitri Dounis, Denver, NC (US); Jeff Malsam, Minneapolis, MN (US)

(73) Assignee: Cargill, Incorporated, Wayzata, MN (US)

( * ) Notice: Subject to any disclaimer, the term of this patent is extended or adjusted under 35 U.S.C. 154(b) by 643 days.

(21) Appl. No.: 11/411,357

(22) Filed: Apr. 25, 2006

(65) Prior Publication Data

US 2006/0264524 A1 Nov. 23, 2006

Related U.S. Application Data

(60) Provisional application No. 60/674,879, filed on Apr. 25, 2005, provisional application No. 60/677,272, filed on May 2, 2005, provisional application No. 60/741,123, filed on Dec. 1, 2005, provisional application No. 60/786,594, filed on Mar. 27, 2006.

(51) Int. Cl.
C08G 18/00 (2006.01)

(52) U.S. Cl. .................. 521/172; 521/170; 521/174; 528/44; 528/74.5

(58) Field of Classification Search ............... 521/170, 521/172, 174
See application file for complete search history.

(56) References Cited

U.S. PATENT DOCUMENTS

| | | | |
|---|---|---|---|
| 2,846,408 A | 8/1958 | Brachhagen et al. | |
| 3,070,608 A * | 12/1962 | Kuester et al. | 549/539 |
| 4,032,468 A | 6/1977 | Treadwell et al. | |
| 4,101,470 A | 7/1978 | McEntire | |
| 4,216,343 A | 8/1980 | Rogier | |
| 4,375,521 A | 3/1983 | Arnold | |
| 4,423,239 A | 12/1983 | Miyazaki et al. | |
| 4,496,487 A | 1/1985 | Peerman et al. | |
| 4,508,853 A | 4/1985 | Kluth et al. | |
| 4,546,120 A | 10/1985 | Peerman et al. | |
| 4,551,517 A | 11/1985 | Herold et al. | |
| 4,617,325 A | 10/1986 | Knobel et al. | |
| 4,618,630 A | 10/1986 | Knobel et al. | |
| 4,742,087 A * | 5/1988 | Kluth et al. | 521/107 |
| 4,775,558 A | 10/1988 | Haas et al. | |
| 4,806,571 A | 2/1989 | Knobel et al. | |
| 4,812,533 A | 3/1989 | Simone et al. | |
| 4,826,922 A | 5/1989 | Li et al. | |
| 4,826,944 A | 5/1989 | Hoefer et al. | |
| 4,886,893 A * | 12/1989 | Meffert et al. | 549/562 |
| 4,992,484 A | 2/1991 | Taylor | |
| 5,026,881 A | 6/1991 | Gruber | |
| 5,032,323 A | 7/1991 | Virnig | |
| 5,164,124 A | 11/1992 | Lange et al. | |
| 5,237,080 A * | 8/1993 | Daute et al. | |
| 5,266,714 A * | 11/1993 | Stoll et al. | 252/182.18 |
| 5,302,626 A | 4/1994 | Hoefer et al. | |
| 5,380,886 A | 1/1995 | Daute et al. | |
| 5,382,647 A | 1/1995 | Daute et al. | |
| 5,403,440 A | 4/1995 | Daute et al. | |
| 5,442,082 A | 8/1995 | Uphues et al. | |
| 5,482,647 A | 1/1996 | Bolkan et al. | |
| 5,482,980 A | 1/1996 | Pcolinsky | |
| 5,512,655 A | 4/1996 | Klauck et al. | |
| 5,609,722 A | 3/1997 | Rodriguez et al. | |
| 5,645,762 A | 7/1997 | Cook et al. | |
| 5,688,989 A | 11/1997 | Daute et al. | |
| 5,795,949 A | 8/1998 | Daute et al. | |
| 6,020,387 A | 2/2000 | Downey et al. | |
| 6,046,298 A | 4/2000 | Beuer et al. | |
| 6,057,375 A | 5/2000 | Wollenweber et al. | |
| 6,071,977 A | 6/2000 | Austin et al. | |
| 6,107,433 A | 8/2000 | Petrovic et al. | |
| 6,133,329 A | 10/2000 | Shieh et al. | |
| 6,180,686 B1 | 1/2001 | Kurth | |
| 6,211,315 B1 | 4/2001 | Larock et al. | |
| 6,258,869 B1 | 7/2001 | Shah et al. | |
| 6,274,750 B1 | 8/2001 | Sato et al. | |
| 6,359,023 B1 | 3/2002 | Kluth et al. | |
| 6,399,698 B1 | 6/2002 | Petrovic et al. | |
| 6,420,443 B1 | 7/2002 | Clark et al. | |

(Continued)

FOREIGN PATENT DOCUMENTS

EP 0 125 579 5/1984

(Continued)

OTHER PUBLICATIONS

International Search Report (revised version) from corresponding International Patent Application No. PCT/US2006/015733, mailed Oct. 23, 2008, 2 pgs.
Zoran, et al., "Structure and Properties of Polyurethanes Based on Model Triglycerides," Polyurethane Expo, Pittsburgh State University paper, 2001, pp. 1-4.
Heidbreder, et al., "Oleochemical Products as Building Blocks for Polymers," Forschungsbeitrage/Research Papers, Wiley-VCH Verlag GmbH, D-69451 Weinheim, 1999, pp. 418-423.
Gruber, et al., "Polyole auf Basis fettchemischer Rohstoffe," Fett Wissechschaft Technologie—Fat Science Technology, 89.Jahrgang, Nr. 4, 1987, pp. 147-151, abstract.

(Continued)

Primary Examiner—Marc S Zimmer
Assistant Examiner—Noah Frank

(57) ABSTRACT

The invention relates to polyurethane foams comprising oligomeric polyols. In embodiments of the invention, the polyurethane foams comprise the reaction product of: (a) a polyisocyanate; and (b) an active-hydrogen containing composition comprising an oligomeric polyol having a hydroxyl number of about 45 to about 65 mg KOH/g, a number average hydroxyl functionality (Fn) of less than about 2.7, and about 40% weight or greater oligomers. The polyurethane foams of the invention may be slabstock foams or molded foams. Also disclosed are low odor polyols and polyurethane compositions.

49 Claims, No Drawings

U.S. PATENT DOCUMENTS

| | | |
|---|---|---|
| 6,433,121 B1 | 8/2002 | Petrovic et al. |
| 6,433,125 B1 | 8/2002 | Gruetzmacher et al. |
| 6,465,569 B1 | 10/2002 | Kurth |
| 6,495,611 B1 * | 12/2002 | Arlt et al. .................... 521/99 |
| 6,548,609 B2 | 4/2003 | Ramirez-de-Arellano-Aburto et al. |
| 6,573,354 B1 | 6/2003 | Petrovic et al. |
| 6,583,302 B1 | 6/2003 | Erhan et al. |
| 6,610,811 B1 | 8/2003 | Westfechtel et al. |
| 6,624,244 B2 | 9/2003 | Kurth |
| 6,649,667 B2 | 11/2003 | Clatty |
| 6,682,673 B1 | 1/2004 | Skwiercz et al. |
| 6,686,435 B1 | 2/2004 | Petrovic et al. |
| 6,730,768 B2 | 5/2004 | Heidbreder et al. |
| 6,864,296 B2 | 3/2005 | Kurth |
| 6,962,636 B2 | 11/2005 | Kurth et al. |
| 6,979,477 B2 | 12/2005 | Kurth et al. |
| 7,045,577 B2 | 5/2006 | Wilkes et al. |
| 7,125,950 B2 | 10/2006 | Dwan'Isa et al. |
| 2002/0058774 A1 | 5/2002 | Kurth et al. |
| 2002/0061936 A1 | 5/2002 | Van Heumen et al. |
| 2002/0099230 A1 | 7/2002 | Ramirez-de-Arellano-Aburto et al. |
| 2002/0119321 A1 | 8/2002 | Kurth et al. |
| 2002/0161161 A1 | 10/2002 | Heidbreder et al. |
| 2002/0192456 A1 | 12/2002 | Mashburn et al. |
| 2003/0065201 A1 | 4/2003 | Mahlum |
| 2003/0083394 A1 | 5/2003 | Clatty |
| 2003/0088054 A1 | 5/2003 | Chasar et al. |
| 2003/0143910 A1 | 7/2003 | Mashburn et al. |
| 2003/0149214 A1 | 8/2003 | Westfechtel et al. |
| 2003/0166735 A1 | 9/2003 | Clatty |
| 2003/0191273 A1 | 10/2003 | Gertzmann et al. |
| 2003/0191274 A1 | 10/2003 | Kurth et al. |
| 2004/0082712 A1 | 4/2004 | Blount |
| 2004/0192859 A1 | 9/2004 | Parker et al. |
| 2004/0209971 A1 | 10/2004 | Kurth et al. |
| 2005/0070620 A1 | 3/2005 | Herrington et al. |
| 2005/0121134 A9 | 6/2005 | Kurth et al. |
| 2005/0124709 A1 | 6/2005 | Krueger et al. |
| 2005/0131092 A1 | 6/2005 | Kurth et al. |
| 2005/0182228 A1 | 8/2005 | Kurth |
| 2005/0239915 A1 | 10/2005 | Provan |
| 2005/0240041 A1 | 10/2005 | Ahmad et al. |
| 2005/0260351 A1 | 11/2005 | Kurth et al. |
| 2006/0003903 A1 | 1/2006 | Ooi et al. |
| 2006/0030632 A1 | 2/2006 | Krueger et al. |
| 2006/0041155 A1 | 2/2006 | Casper |
| 2006/0041156 A1 | 2/2006 | Casper et al. |
| 2006/0041157 A1 | 2/2006 | Petrovic et al. |
| 2006/0167125 A1 | 7/2006 | Bauer et al. |
| 2006/0229375 A1 | 10/2006 | Hsiao et al. |
| 2006/0251881 A1 | 11/2006 | Gilder |
| 2006/0270747 A1 | 11/2006 | Griggs |
| 2007/0110877 A1 | 5/2007 | Kassim Shaari et al. |
| 2007/0265459 A1 | 11/2007 | Suppes et al. |

FOREIGN PATENT DOCUMENTS

| | | |
|---|---|---|
| EP | 0 127 810 | 5/1984 |
| EP | 0 340 587 | 4/1989 |
| EP | 0 361 080 | 8/1989 |
| EP | 0 432 208 | 6/1991 |
| EP | 0 553 127 | 4/1992 |
| EP | 0 554 590 | 9/1992 |
| EP | 0 600 958 | 6/1994 |
| EP | 0 759 043 | 2/2000 |
| GB | 2428677 | 2/2007 |
| JP | 2004244443 | 9/2004 |
| SG | 55223 | 12/1998 |
| WO | WO 00/73368 | 12/0000 |
| WO | WO 92/07017 | 4/1992 |
| WO | WO 92/11251 | 7/1992 |
| WO | WO 97/21748 | 6/1997 |
| WO | WO 01/25184 | 4/2001 |
| WO | WO 01/70842 | 9/2001 |
| WO | WO 02/10247 | 2/2002 |
| WO | WO 03/029182 | 4/2003 |
| WO | WO 03/078493 | 9/2003 |
| WO | WO 2004/020497 | 3/2004 |
| WO | WO 2004/063245 | 7/2004 |
| WO | WO 2004/071281 | 8/2004 |
| WO | WO 2004/096882 | 11/2004 |
| WO | WO 2004/096883 | 11/2004 |
| WO | WO 2005/000934 | 1/2005 |
| WO | WO 2005/003202 | 1/2005 |
| WO | WO 2005/078000 | 8/2005 |
| WO | WO 2005/123798 | 12/2005 |
| WO | WO 2006/012344 | 2/2006 |
| WO | WO 2006/047431 | 5/2006 |
| WO | WO 2006/047432 | 5/2006 |
| WO | WO 2006/047433 | 5/2006 |
| WO | WO 2006/047434 | 5/2006 |
| WO | WO 2006/065345 | 6/2006 |
| WO | WO 2006/071549 | 7/2006 |
| WO | WO 2006/116456 | 11/2006 |
| WO | WO 2006/118995 | 11/2006 |
| WO | WO 2007/019051 | 2/2007 |
| WO | WO 2007/019063 | 2/2007 |
| WO | WO 2007/123637 | 11/2007 |
| WO | WO 2007/127379 | 11/2007 |
| WO | WO 2007/130524 | 11/2007 |
| WO | WO 2008/063594 | 5/2008 |
| WO | WO 2008/063613 | 5/2008 |

OTHER PUBLICATIONS

Eychenne, et al., "High concentration of 1-(3-)monoglycerides by direct partial esterification of fatty acids with glycerol," Fett/Lipd 101, Wiley-VCH Verlag GmbH, D-69451 Weinheim, Nr. 11, 1999, p. 424.

Shaari, et al., "Effect of Triethanolamine on the Properties of Palm-Based Flexible Polyurethane Foams," Journal of Oil Palm Research, vol. 16, No. 1, Jun. 2004, pp. 66-71.

Shogren, et al., "Biodegradation Behavior of Some Vegetable Oil-based Polymers," Journal of Polymers and the Environment, vol. 12, No. 3, Jul. 2004, pp. 173-178.

Singh, et al., "Viscoelastic Changes and Cell Opening of Reacting Polyurethane Foams from Soy Oil," Polymer Engineering and Science, vol. 44, No. 10, Oct. 2004, pp. 1977-1986.

Maznee, et al., "Effects of Additives on Palm-based Polyurethane Foams," Journal of Oil Palm Research, vol. 13, No. 2, Dec. 2001, pp. 7-15.

Amad, et al., "Palm-based Polyols and Polyurethanes," Malaysian Palm Oil Board, 170, No. 153, May 2002, 4 pgs.

Shaari, et al., "Effect of Phthalates on the Properties of Palm-Based Flexible Polyurethane Foam," Proceedings of the PIPOC 2003 International Palm Oil Congress, Malaysian Palm Oil Board, pp. 263-271 and cover sheet.

Karlheinz Hill, "Fats and oils as oleochemical raw materials," Pure Appl. Chem., vol. 72, No. 7, 2000, pp. 1255-1264.

Hofer, et al., "Oleochemical Polyols—A New Raw Material Source for Polyurethane Coatings and Floorings," Journal of Coatings Technology, vol. 69, No. 869, Jun. 1997, pp. 65-72.

Mukerjea, et al., "Polyurethane foam based on castor oil and its derivatives," Popular Plastics, Jun. 1982, pp. 3-5.

Arjun Sen, "Oleochemical polyols for polyurethane coatings," Paintindia, Apr. 2004, pp. 61-70.

Lyon, et al., "Solvent-Blown Rigid Urethane Foams from Castor-Based Polyols," Journal of the American Oil Chemists' Society, vol. 38, May 1961, pp. 262-266.

John, et al., "Characterization of Polyurethane Foams from Soybean Oil," Journal of Applied Polymer Science, vol. 86, 2002, pp. 3097-3107.

Colvin "Low Cost Polyols from Natural Oils" *UTECH Asia '95* May 1995, Suntec City, Singapore, Paper 36:1-9.

Urethane Soy Systems Company "Companies Using SoyOyl Biobased Polyols in Their Polyurethane Products", printed from the internet http://www.soyoyl.com/products/applications.asp on Aug. 12, 2002.

* cited by examiner

POLYURETHANE FOAMS COMPRISING OLIGOMERIC POLYOLS

CROSS-REFERENCE TO RELATED APPLICATIONS

This application claims the benefit of U.S. Provisional Application Ser. No. 60/674,879, filed Apr. 25, 2005, entitled "Foams Incorporating Low Functionality Polyols"; U.S. Provisional Application Ser. No. 60/677,272, filed May 2, 2005, entitled "Foams Incorporating Low Functionality Polyols"; U.S. Provisional Application Ser. No. 60/741,123, filed Dec. 1, 2005, entitled "Polyurethane Foams Comprising Oligomeric Modified Vegetable Oil-based Polyols; and U.S. Provisional Application Ser. No. 60/786,594, entitled "Oligomeric Polyols from Palm-Based Oils and Polyurethane Compositions Made Therefrom", filed Mar. 27, 2006; the disclosures of which are all incorporated herein by reference in their entirety.

FIELD

This invention relates to polyurethane foams comprising oligomeric polyols.

BACKGROUND

Flexible polyurethane foams are commonly made by reacting petroleum-derived polyols or polyol compositions with organic polyisocyanates in the presence of catalysts, blowing agents and other optional ingredients. Since the 1960's, flexible polyurethane foams have been used as a cushioning, load-bearing, and comfort-providing component of automotive, bedding and transportation.

In producing flexible polyurethane foams, several properties of the polyols or polyol compositions used are important for manufacturing flexible foams that have desirable characteristics. One important polyol property is the number average hydroxyl functionality of the polyol. Typically, to form a flexible polyurethane foam having desirable characteristics, a polyol having a number average hydroxyl functionality of about 3 is desired. It is conventionally understood that as the number average hydroxyl functionality decreases from that desired range, the quality of the polyurethane polymer network is lost and the foam characteristics quickly degrade. Once the number average functionality is 3.0 or less, it is expected that stable open cell foam will not form or if formed will have such poor physical properties that it will not be useful.

Polyurethane foam properties can be measured by various methods. In general, foams may be measured for tensile strength, tear, hardness, elongation, compression, and other properties. The relative importance of the properties varies, depending upon the expected use of the foam.

Petroleum-derived polyols have been widely used in the manufacturing of foams. However, there has been an increased interest in the use of renewable resources in the manufacturing of foams. This has led to research into developing vegetable oil-based polyols for use in the manufacturing of foams.

Other researchers have tried to make flexible foam from biobased polyols. WO 2004/096883A1 and WO2004/09882A1 report how to make TDI-based conventional slabstock foams from biobased polyol formulations and provide physical properties of the resulting foams. The reported biobased polyols have a number average hydroxyl functionality greater than 2.8.

SUMMARY

The invention relates to polyurethane foams that comprise oligomeric polyols. In some embodiments, the polyurethane foams are slabstock foams, for example, flexible slabstock foams. In other embodiments, the polyurethane foams are molded foams.

In one aspect, the invention provides polyurethane foams comprising the reaction product of: (a) a polyisocyanate; and (b) an active-hydrogen containing composition comprising an oligomeric polyol having a hydroxyl number of about 45 to about 65 mg KOH/g, a number average hydroxyl functionality (Fn) of less than about 2.7, and about 40% weight or greater oligomers.

In some embodiments, the oligomeric polyol has a degree of ring-opening and oligomerization of an epoxidized natural oil that provides the oligomeric polyol with a desired balance of properties. That is, the degree of ring-opening and oligomerization are controlled to provide an oligomeric polyol having a desired hydroxyl (OH) number, number average hydroxyl functionality (Fn), epoxy oxygen content (EOC), viscosity, molecular weight, distance between reactive hydroxyl groups, and the like. For example, in some embodiments, the epoxidized natural oil is partially ring-opened in order to provide an oligomeric polyol having a residual epoxy oxygen content (EOC) of about 0.01 to about 5.5%. In some embodiments, the degree of oligomerization of the polyol is controlled so that the oligomeric polyol has about 40% weight or greater oligomers, for example, about 55% to about 65% weight oligomers, wherein the oligomers include dimers, trimers, tetramers, and higher order oligomers. For example, the oligomeric polyol may comprise about 8% to about 12% weight dimers, about 5% to about 10% weight trimers, and about 35% weight or greater tetramers and higher order oligomers. In some embodiments, the oligomeric polyol has a hydroxyl number from about 45 to about 65 mg KOH/g.

In some embodiments, the oligomeric polyol is used to replace at least a portion of one or more petroleum-derived polyols in a polyurethane foam formulation. For example, in flexible slabstock polyurethane foam formulations, the oligomeric polyol can replace at least a portion of a petroleum-derived polyol, for example, a petroleum-derived triol having a molecular weight of about 3000 grams/mole and a hydroxyl number of about 56 mg KOH/g. Accordingly, in some embodiments, the active-hydrogen containing composition comprises an oligomeric polyol and a petroleum-derived polyol. Typically, the active-hydrogen containing composition comprises about 10% to about 60% weight oligomeric polyol and about 40% to about 90% petroleum-derived triol, or about 15% to about 40% weight oligomeric polyol and about 60% to about 85% petroleum-derived polyol.

Advantageously, it has been observed that when the active-hydrogen containing compound comprises an oligomeric polyol and a petroleum-derived polyol, the support factor of the resulting flexible slabstock foam can be controlled by varying the amount of oligomeric polyol and petroleum-derived polyol independent of the density of the foam. Specifically, as the amount of oligomeric polyol is increased, the support factor also increases for constant density foams.

In many embodiments, the oligomeric polyol has a low number average hydroxyl functionality, for example, about 2.7 or less. Although low hydroxyl functionality polyols are known to deteriorate some physical properties (e.g., tensile strength, tear strength, etc.) of flexible polyurethane foams due to the fact that monofunctional species may act as chain terminators, polyurethane foams of the present invention have physical properties that are better than that which would be predicted for foams comprising a low number average hydroxyl functionality polyol.

In some embodiments, the polyurethane foams of the invention have an outer skin density that is lower than the outer skin density of a polyurethane foam comprising a control formulation based on petroleum-derived triol. In some embodiments, the density of the outer skin of the polyurethane foam is reduced by about 0.25 lb/ft$^3$ or greater as compared to a control formulation. In some embodiments, the density of the outer skin is reduced by about 0.50 lb/ft$^3$ or greater, or about 0.75 lb/ft$^3$ or greater, or about 1.0 lb/ft$^3$ or greater as compared to the control formulation.

In some embodiments, the polyurethane foams of the invention have improved hand touch as compared to polyurethane foams comprising a control formulation that does not include the oligomeric polyol. Hand touch may be measured, for example, by 5% IFD, surface roughness, and average cell size. In some embodiments, the 5% IFD is reduced by about 2% or greater as compared to the IFD of the control formulation.

In some embodiments, the polyurethane foams of the invention have improved flame retardancy as compared to polyurethane foams comprising a control formulation that does not include the oligomeric polyol. For example, the polyurethane foams may have improved char length as measured by Technical Bulletin 117 "Requirements, Test Procedure and Apparatus for Testing the Flame Retardance of Resilient Filling Materials Used in Upholstered Furniture" (March 2000).

In some embodiments, the oligomeric polyols are low in odor-producing compounds resulting in polyurethane foams having low odor. Odor can be measured, for example, by measuring the amount of odor-producing compounds, for example, the compounds hexanal, nonanal, and decanal. Accordingly, in another aspect, the invention provides low odor oligomeric polyols and low odor polyurethane foams made therefrom. In some embodiments, the oligomeric polyol or polyurethane foam has about 30 ppm or less hexanal. In some embodiments, the oligomeric polyol or polyurethane foam has about 30 ppm or less nonanal. In some embodiments, the oligomeric polyol or polyurethane foam has about 20 ppm or less decanal. In some embodiments, the combined amount of hexanal, nonanal, and decanal in the oligomeric polyol or polyurethane foam is about 80 ppm or less.

Other advantages of the polyurethane foams of the invention are described herein including, for example, improved water resistance, color-fastness, and IFD gradient.

As used herein "polyol" refers to a molecule that has an average of greater than 1.0 hydroxyl groups per molecule. It may also include other functionalities.

As used herein "oligomeric polyol" refers to a non-naturally occurring polyol prepared by ring-opening a fully or partially epoxidized natural oil (such as a plant-based oil or an animal fat) in a manner that results in the formation of oligomers.

As used herein "oligomer" refers to two or more triglyceride-based monomers that have been chemically bonded to one another by an epoxide ring-opening reaction. Oligomers include dimers, trimers, tetramers, and higher order oligomers.

As used herein "dimer" refers to two triglyceride-based monomers that have been chemically bonded to one another by an epoxide ring-opening reaction.

As used herein "trimer" refers to three triglyceride-based monomers that have been chemically bonded to one another by an epoxide ring-opening reaction.

As used herein "tetramer" refers to four triglyceride-based monomers that have been chemically bonded to one another by an epoxide ring-opening reaction.

As used herein "slabstock" refers to polyurethane foam made by mixing the reactants and dispensing them onto a carrier where they free-rise and cure to form a continuous block or bun of polyurethane foam that typically has a nominal rectangular cross-section. Included within slabstock polyurethane foams are flexible slabstock polyurethane foams.

As used herein "molded" refers to polyurethane foam that is prepared by mixing the reactants and dispensing them into a mold where they react to fill the mold and assume the shape of the mold cavity.

As used herein "active hydrogen-containing composition" refers to a composition that includes reactants having hydrogen atom-containing groups that are capable of reacting with isocyanate groups. Examples include alcohols (e.g., polyols) and amines (e.g., polyamines).

As used herein "petroleum-derived polyol" refers to a polyol manufactured from a petroleum feedstock.

As used herein "control formulation" refers to a polyurethane formulation where the oligomeric polyol has been replaced by an equal amount of petroleum-derived triol such as a 3000 gram/mole petroleum-derived triol.

DETAILED DESCRIPTION

The invention relates to polyurethane foams (e.g., flexible slabstock polyurethane foams) comprising oligomeric polyols.

Preparation of Oligomeric Polyols

The oligomeric polyols useful in the polyurethane foams of the present invention can be prepared by ring-opening an epoxidized natural oil. In many embodiments, the ring-opening is conducted using a reaction mixture comprising: (1) an epoxidized natural oil, (2) a ring-opening acid catalyst, and (3) a ring-opener. These materials are described in more detail below. Also useful in some embodiments of the polyurethane foams of the invention are the modified vegetable oil-based polyols reported in WO 2006/012344A1 (Petrovic et al.).

Epoxidized Natural Oil

The first component is an epoxidized natural oil. Epoxidized natural oils include, for example, epoxidized plant-based oils (e.g., epoxidized vegetable oils) and epoxidized animal fats. The epoxidized natural oils may be partially or fully epoxidized. Partially epoxidized natural oil may include at least about 10%, at least about 20%, at least about 25%, at least about 30%, at least about 35%, at least about 40% or more of the original amount of double bonds present in the oil. The partially epoxidized natural oil may include up to about 90%, up to about 80%, up to about 75%, up to about 70%, up to about 65%, up to about 60%, or fewer of the original amount of double bonds present in the oil. Fully epoxidized natural oil may include up to about 10%, up to about 5%, up to about 2%, up to about 1%, or fewer of the original amount of double bonds present in the oil.

Examples of natural oils include plant-based oils (e.g., vegetable oils) and animal fats. Examples of plant-based oils include soybean oil, safflower oil, linseed oil, corn oil, sunflower oil, olive oil, canola oil, sesame oil, cottonseed oil, palm-based oils, rapeseed oil, tung oil, peanut oil, and combinations thereof. Animal fats may also be used, for example, fish oil, lard, and tallow. The plant-based oils may be natural or genetically modified vegetable oils, for example, high oleic safflower oil, high oleic soybean oil, high oleic peanut oil, high oleic sunflower oil, and high erucic rapeseed oil (crambe oil). The number of double bonds per molecule in a natural oil may be quantified by the iodine value (IV) of the oil. For example, a vegetable oil having one double bond per molecule corresponds to an iodine value of about 28. Soybean oil typically has about 4.6 double bonds/molecule and has an iodine value of about 127-140. Canola oil typically has about 4.1 double bonds/molecule and has an iodine value of about 115. Typically, iodine values for the vegetable oils will range from about 40 to about 240. In some embodiments, vegetable oils having an iodine value greater than about 80, greater than about 100, or greater than about 110 are used. In some embodiments, vegetable oils having an iodine value less than about 240, less than about 200, or less than about 180 are used.

Useful natural oils comprise triglycerides of fatty acids. The fatty acids may be saturated or unsaturated and may contain chain lengths ranging from about C12 to about C24. Unsaturated fatty acids include monounsaturated and polyunsaturated fatty acids. Common saturated fatty acids include lauric acid (dodecanoic acid), myristic acid (tetradecanoic acid), palmitic acid (hexadecanoic acid), steric acid (octadecanoic acid), arachidic acid (eicosanoic acid), and lignoceric acid (tetracosanoic acid). Common monounsaturated fatty acids include palmitoleic (a C16 unsaturated acid) and oleic (a C18 unsaturated acid). Common polyunsaturated fatty acids include linoleic acid (a C18 di-unsaturated acid), linolenic acid (a C18 tri-unsaturated acid), and arachidonic acid (a C20 tetra-unsaturated acid). The triglyceride oils are made up of esters of fatty acids in random placement onto the three sites of the trifunctional glycerine molecule. Different vegetable oils will have different ratios of these fatty acids. The ratio of fatty acid for a given vegetable oil will also vary depending upon such factors, for example, as where the crop is grown, maturity of the crop, weather during the growing season, etc. Because of this it is difficult to provide a specific or unique composition for any given vegetable oil, rather the composition is typically reported as a statistical average. For example, soybean oil contains a mixture of stearic acid, oleic acid, linoleic acid, and linolenic acid in the ratio of about 15:24:50:11. This translates into an average molecular weight of about 800-860 grams/mole, an average number of double bonds of about 4.4 to about 4.7 per triglyceride, and an iodine value of about 120 to about 140.

In an exemplary embodiment, the epoxidized natural oil is fully epoxidized soybean oil. Although not wishing to be bound by theory, it is believed that the use of saturated epoxidized vegetable oils having residual epoxy groups leads to oligomeric polyols having good oxidative stability. It is also believed that the use of unsaturated epoxidized vegetable oils leads to oligomeric polyols having a lower viscosity as compared to products prepared using saturated epoxidized vegetable oils.

In another exemplary embodiment, the natural oil is a palm-based oil. As used herein "palm-based oil" refers to an oil or oil fraction obtained from the mesocarp and/or kernel of the fruit of the oil palm tree. Palm-based oils include palm oil, palm olein, palm stearin, palm kernel oil, palm kernel olein, palm kernel stearin, and mixtures thereof. Palm-based oils may be crude, refined, degummed, bleached, deodorized, fractionated, or crystallized. In many embodiments, the palm-based oils are refined, bleached, and deodorized (i.e., an "RBD" oil).

Palm oil refers to the oil derived from the mesocarp of the oil palm fruit. Palm oil is typically a semi-solid at room temperature and comprises about 50% saturated fatty acids and about 50% unsaturated fatty acids. Palm oil typically comprises predominately fatty acid triglycerides, although monoglycerides and diglycerides may also be present in small amounts. The fatty acids typically have chain lengths ranging from about C12 to about C20. Representative saturated fatty acids include, for example, C12:0, C14:0, C16:0, C18:0, and C20:0 saturated fatty acids. Representative unsaturated fatty acids include, for example, C16:1, C18:1, C18:2, and C18:3 unsaturated fatty acids. Representative compositional ranges for palm oil are listed in TABLE A.

Palm olein refers to the liquid fraction that is obtained by fractionation of palm oil after crystallization at a controlled temperature. Relative to palm oil, palm olein has a higher content of unsaturated fatty acids, for example, C18:1 and C18:2 fatty acids, and has a higher iodine value. In some embodiments, the palm olein is fractionated multiple times to produce palm olein having a higher content of unsaturated fatty acids (C18:1, C18:2) and a higher iodine value. Multiple fractionated palm olein may in some instances be referred to as super palm olein. Representative compositional ranges for palm olein are listed in TABLE A. Representative examples of commercially available palm oil and palm olein include those commercially available under the trade designations "SANS TRANS 25", "SANS TRANS-39", and "DURKEX NT100" from IOI Group, Loders Croklaan Company; and "FULLY REFINED PALM OLEIN IV 62-SUPEROLEIN" (from Cargill, Incorporated.).

Palm stearin refers to the solid fraction that is obtained by fractionation of palm oil after crystallization at controlled temperature. Relative to palm oil, palm stearin contains more saturated fatty acids and has a higher melting point. A representative composition for palm stearin is provided in TABLE A.

TABLE A

| Fatty Acid | Palm Oil (% wt.) | Palm Olein (% wt.) | Palm Stearin (% wt.) |
|---|---|---|---|
| C12:0 | <1% | <1% | <1% |
| C14:0 | <2% | <2% | <2% |
| C16:0 | 40-50% | 35-45% | 45-75% |
| C16:1 | <1% | <1% | <1% |
| C18:0 | 3-6% | 3-5% | 4-6% |
| C18:1 | 35-45% | 40-47% | 10-40% |
| C18:2 | 8-12% | 10-15% | 2-10% |
| C18:3 | <1% | <1% | <1% |
| C20:0 | <1% | <1% | <1% |
| Iodine Value (IV) | 50 to 65 | 55 to 62 | 20 to 50 |

A partially epoxidized or fully epoxidized natural oil may be prepared by a method that comprises reacting a natural oil with a peroxyacid under conditions that convert a portion of or all of the double bonds of the oil to epoxide groups.

Examples of peroxyacids include peroxyformic acid, peroxyacetic acid, trifluoroperoxyacetic acid, benzyloxyperoxyformic acid, 3,5-dinitroperoxybenzoic acid, m-chloroperoxybenzoic acid, and combinations thereof. In some embodiments, peroxyformic acid or peroxyacetic acid are used. The peroxyacids may be added directly to the reaction mixture, or they may be formed in-situ by reacting a hydroperoxide with a corresponding acid such as formic acid, benzoic acid, fatty acids (e.g., oleic acid), or acetic acid. Examples of hydroperoxides that may be used include hydrogen peroxide, tert-butylhydroperoxide, triphenylsilylhydroperooxide, cumylhydroperoxide, and combinations thereof. In an exemplary embodiment, hydrogen peroxide is used. Typically, the amount of acid used to form the peroxyacid ranges from about 0.25 to about 1.0 moles of acid per mole of double bonds in the vegetable oil, more typically ranging from about 0.45 to about 0.55 moles of acid per mole of double bonds in the vegetable oil. Typically, the amount of hydroperoxide used to form the peroxy acid is about 0.5 to about 1.5 moles of hydroperoxide per mole of double bonds in the vegetable oil, more typically about 0.8 to about 1.2 moles of hydroperoxide per mole of double bonds in the vegetable oil.

Typically, an additional acid component is also present in the reaction mixture. Examples of such additional acids include sulfuric acid, toluenesulfonic acid, trifluoroacetic acid, fluoroboric acid, Lewis acids, acidic clays, or acidic ion exchange resins.

Optionally, a solvent may be added to the reaction. Useful solvents include chemically inert solvents, for example, aprotic solvents. These solvents do not include a nucleophile and are non-reactive with acids. Hydrophobic solvents, such as aromatic and aliphatic hydrocarbons, are particularly desirable. Representative examples of suitable solvents include benzene, toluene, xylene, hexane, isohexane, pentane, heptane, and chlorinated solvents (e.g., carbon tetrachloride). In an exemplary embodiment, toluene is used as the solvent. Solvents may be used to reduce the speed of reaction or to reduce the number of side reactions. In general, a solvent also acts as a viscosity reducer for the resulting composition.

Subsequent to the epoxidation reaction, the reaction product may be neutralized. A neutralizing agent may be added to neutralize any remaining acidic components in the reaction product. Suitable neutralizing agents include weak bases, metal bicarbonates, or ion-exchange resins. Examples of neutralizing agents that may be used include ammonia, calcium carbonate, sodium bicarbonate, magnesium carbonate, amines, and resin, as well as aqueous solutions of neutralizing agents. Typically, the neutralizing agent will be an anionic ion-exchange resin. One example of a suitable weakly-basic ion-exchange resin is sold under the trade designation "LEWATIT MP-64" (from Bayer). If a solid neutralizing agent (e.g., ion-exchange resin) is used, the solid neutralizing agent may be removed from the epoxidized vegetable oil by filtration. Alternatively, the reaction mixture may be neutralized by passing the mixture through a neutralization bed containing a resin or other materials. Alternatively, the reaction product may be repeatedly washed to separate and remove the acidic components from the product. In addition, on or more of the processes may be combined in neutralizing the reaction product. For example, the product could be washed, neutralized with a resin material, and then filtered.

Subsequent to the epoxidation reaction, excess solvents may be removed from the reaction product (i.e., fully epoxidized vegetable oil). The excess solvents include products given off by the reaction, or those added to the reaction. The excess solvents may be removed by separation, vacuum, or other method. Preferably, the excess solvent removal will be accomplished by exposure to vacuum.

Useful fully-epoxidized soybean oils include those commercially available under the trade designations EPOXOL 7-4 (from American Chemical Systems) and FLEXOL ESO (from Dow Chemical Co.).

Ring-Opening Acid Catalyst

In many embodiments, the ring-opening reaction is conducted in the presence of a ring-opening acid catalyst. Representative examples of ring-opening acid catalysts include Lewis or Brönsted acids. Examples of Brönsted acids include hydrofluoroboric acid ($HBF_4$), triflic acid, sulfuric acid, hydrochloric acid, phosphoric acid, phosphorous acid, hypophosphorous acid, boronic acids, sulfonic acids (e.g., para-toluene sulfonic acid, methanesulfonic acid, and trifluoromethane sulfonic acid), and carboxylic acids (e.g., formic acid and acetic acid). Examples of Lewis acids include phosphorous trichloride and boron halides (e.g., boron trifluoride). Ion exchange resins in the protic form may also be used. In an exemplary embodiment, the ring-opening catalyst is hydrofluoroboric acid ($HBF_4$). The ring-opening catalyst is typically present in an amount ranging from about 0.01% wt. to about 0.3% wt., more typically ranging from about 0.05% wt. to about 0.15% wt. based upon the total weight of the reaction mixture.

Ring-Opener

The third component of the reaction mixture is a ring-opener. Various ring-openers may be used including alcohols, water (including residual amounts of water), and other compounds having one or more nucleophilic groups. Combinations of ring-openers may be used. In some embodiments, the ring-opener is a monohydric alcohol. Representative examples include methanol, ethanol, propanol (including n-propanol and isopropanol), and butanol (including n-butanol and isobutanol), and monoalkyl ethers of ethylene glycol (e.g., methyl cellosolve, butyl cellosolve, and the like). In an exemplary embodiment, the alcohol is methanol. In some embodiments, the ring-opener is a polyol. For use in flexible foams, it is generally preferred to use polyols having about 2 or less hydroxyl groups per molecule. Polyol ring-openers useful in making oligomeric polyols for use in flexible foams include, for example, ethylene glycol, propylene glycol, 1,3-propanediol, butylene-glycol, 1,4-butane diol, 1,5-pentanediol, 1,6-hexanediol, polyethylene glycol, and polypropylene glycol. Also useful are vegetable oil-based polyols.

Ring-Opening Reaction

The ring-opening reaction is conducted with a ratio of ring-opener to epoxide that is less than stoichiometric in order to promote oligomerization of the resulting ring-opened polyol. In an exemplary embodiment, an oligomeric polyol is prepared by reacting fully epoxidized soybean oil (ESBO) with methanol in the presence of a ring-opening catalyst, for example, fluoroboric acid. Typically, the molar ratio of methanol to fully epoxidized soybean oil will range from about 0.5 to about 3.0, more typically ranging from about 1.0 to about 2.0. In an exemplary embodiment, the molar ratio of the methanol to the epoxidized soybean oil ranges from about 1.3 to about 1.7.

Typically, at the start of the reaction, the fully epoxidized soybean oil has an epoxide oxygen content (EOC) ranging from about 6.8% to about 7.4%. The ring-opening reaction is preferably stopped before all of the epoxide rings are ring-opened. For some ring-opening catalyst, the activity of the catalyst decreases over time during the ring-opening reaction. Therefore, the ring-opening catalyst may be added to the reactive mixture at a controlled rate such that the reaction stops at (or near) the desired endpoint EOC. The ring-opening reaction may be monitored using known techniques, for example, hydroxyl number titration (ASTM E1899-02), EOC titration (AOCS Cd9-57 method) or monitoring the heat removed from the exothermic reaction.

Typically, when fully epoxidized soybean oil is used, the ring-opening reaction is stopped when the residual epoxy oxygen content (EOC) ranges from about 0.01% to about 6.0%, for example, about 0.5% to about 5.5%, about 1% to about 5.0%, about 2% to about 4.8%, about 3% to about 4.6%, or about 3.5% to about 4.5%. When other epoxidized natural oils are used, the residual epoxy oxygen content (EOC) of the polyol may be different. For example, for palm oil, the residual EOC may range from about 0.01% to about 3.5%, for example, about 0.2% to about 3.0%, about 0.5% to about 2.0%, or about 0.8% to about 1.5%. As used herein "epoxy oxygen content" or "EOC" refers to the weight of epoxide oxygen in a molecule expressed as percentage.

During the ring-opening reaction, some of the hydroxyl groups of the ring-opened polyol react with epoxide groups that are present on other molecules in the reactive mixture (e.g., molecules of unreacted fully epoxidized soybean oil or molecules of polyol having unreacted epoxide groups) resulting in oligomerization of the polyol (i.e., the formation of dimers, trimers, tetramers, and higher order oligomers). The degree of oligomerization contributes to the desired properties of the oligomeric polyol including, for example, number average hydroxyl functionality, viscosity, and the distance between reactive hydroxyl groups. In some embodiments, the oligomeric polyol comprises about 40% weight or greater oligomers (including dimers, trimers, and higher order oligomers). In some embodiments, the oligomeric polyol comprises about 35% to about 45% weight monomeric polyol and about 55% to about 65% weight oligomers (e.g., dimers, trimers, tetramers, and higher order oligomers). For example, in some embodiments, the oligomeric polyol comprises about 35% to about 45% weight monomeric polyol, about 8% to about 12% weight dimerized polyol, about 5% to about 10% weight trimerized polyol, and about 35% weight or greater of higher order oligomers.

Oligomerization may be controlled, for example, by catalyst concentration, reactant stoichiometry, and degree of agitation during ring-opening. Oligomerization tends to occur to a greater extent, for example, with higher concentrations of catalyst or with lower concentration of ring-opener (e.g., methanol). Upon completion of the ring-opening reaction, any unreacted methanol is typically removed, for example, by vacuum distillation. Unreacted methanol is not desirable in the oligomeric polyol because it is a monofunctional species that will end-cap the polyisocyanate. After removing any excess methanol, the resulting polyol is typically filtered, for example, using a 50 micron bag filter in order to remove any solid impurities.

Properties of the Oligomeric Polyol

In some embodiments, the oligomeric polyols have a low number average hydroxyl functionality. Number average hydroxyl functionality refers to the average number of pendant hydroxyl groups (e.g., primary, secondary, or tertiary hydroxyl groups) that are present on a molecule of the polyol. In some embodiments, the oligomeric polyol has a number average hydroxyl functionality (Fn) about 2.7 or less, for example, about 2.6 or less, about 2.5 or less, about 2.4 or less, about 2.3 or less, about 2.2 or less, about 2.1 or less, about 2.0 or less, about 1.9 or less, about 1.8 or less, about 1.7 or less, about 1.6 or less, about 1.5 or less, or about 1.4 or less. Typically, the number average hydroxyl functionality ranges from about 1.5 to about 2.4 or from about 1.7 to about 2.2.

In some embodiments, the oligomeric polyol has a hydroxyl number (OH number) that ranges from about 45 to about 65 mg KOH/g, or from about 55 to about 65 mg KOH/g. Hydroxyl number indicates the number of reactive hydroxyl groups available for reaction. It is expressed as the number of milligrams of potassium hydroxide equivalent to the hydroxyl content of one gram of the sample. A hydroxyl number in the range of about 45 to about 65 mgKOH/g is desirable because it facilitates the use of the oligomeric polyol in flexible slabstock polyurethane formulations where the oligomeric polyol replaces at least a portion of petroleum-derived triols that are typically used in such formulations. For example, in some embodiments, the oligomeric polyol replaces at least a portion of a petroleum-derived triol having a molecular weight of about 3000 grams/mole and a hydroxyl number of about 56.

In some embodiments, the oligomeric polyol has a low acid value. Acid value is equal to the number of milligrams of potassium hydroxide (KOH) that is required to neutralize the acid that is present in one gram of a sample of the polyol (i.e., mg KOH/gram). A high acid value is undesirable because the acid may neutralize the amine catalyst causing a slowing of the foaming rate. In some embodiments, the oligomeric polyol has an acid value that is less than about 5 (mg KOH/gram), for example, less than about 4 (mg KOH/gram), less than about 3 (mg KOH/gram), less than about 2 (mg KOH/gram), or less than about 1 (mg KOH/gram). In exemplary embodiments, the acid value is less than about 1 (mg KOH/gram), for example, less than about 0.5 (mg KOH/gram), or from about 0.2 to about 0.5 (mg KOH/gram).

In some embodiments, the number average molecular weight (i.e, Mn) of the oligomeric polyol is about 1000 grams/mole or greater, for example, about 1100 grams/mole or greater, about 1200 grams/mole or greater, about 1300 grams/mole or greater, about 1400 grams/mole or greater, or about 1500 grams/mole or greater. In some embodiments, the Mn is less than about 5000 grams/mole, for example, less than about 4000 grams/mole, less than about 3000 grams/mole, or less than about 2000 grams/mole. In some embodiments, the Mn ranges from about 1000-5000 grams/mole, for example, about 1200-3000 grams/mole, about 1300-2000 grams/mole, about 1700-1900 grams/mole, or about 1500-1800 grams/mole. Number average molecular weight may be measured, for example, using light scattering, vapor pressure osmometry, end-group titration, and colligative properties.

In some embodiments, the weight average molecular weight (i.e, Mw) of the oligomeric polyol is about 5000 grams/mole or greater, for example, about 6000 grams/mole or greater, about 7000 grams/mole or greater, or about 8000 grams/mole or greater. In some embodiments, the Mw is less than about 50,000 grams/mole, for example, less than about 40,000 grams/mole, less than about 30,000 grams/mole, or less than about 20,000 grams/mole. In some embodiments, the Mw ranges from about 5000-50,000 grams/mole, for example, about 5000-20,000 grams/mole, or about 6000-15,000 grams/mole. Weight average molecular weight may be measured, for example, using light scattering, small angle neutron scattering (SANS), X-ray scattering, and sedimentation velocity.

Typically the oligomeric polyol has a polydispersity (Mw/Mn) of about 3-15, for example, about 4-12, or about 5-10.

In some embodiments, the oligomeric polyol has a viscosity at 25° C. of about 0.5 to about 10 Pa·s. When soybean oil is used, the viscosity of the oligomeric polyol typically ranges from about 2 to about 8 Pa·s, or from about 3 to about 7 Pa·s. When a palm-based oil is used, the viscosity of the oligomeric polyol is typically about 4 Pa·s or less, for example, about 3 Pa·s or less, about 2 Pa·s or less, about 1 Pa·s or less, or about 0.7 Pa·s or less. In some embodiments, the viscosity of the oligomeric polyol made from a palm-based oil is about 0.5 Pa·s to about 2 Pa·s.

In some embodiments, the oligomeric polyol has few, if any, residual double bonds. This is particularly true if the oligomeric polyol is prepared from fully epoxidized soybean oil. One measure of the amount of double bonds in a substance is its iodine value (IV). The iodine value for a compound is the amount of iodine that reacts with a sample of a substance, expressed in centigrams iodine ($I_2$) per gram of substance (cg $I_2$/gram). In some embodiments, the oligomeric polyol has an iodine value that is less than about 50, for example, less than about 40, less than about 30, less than about 20, less than about 10, or less than about 5.

Polyurethane Foam

The invention provides polyurethane compositions that are useful for preparing polyurethane foams, for example, slabstock polyurethane foams or molded polyurethane foams. In some embodiments, the polyurethane foam comprises the reaction product of:

(a) a polyisocyanate; and (b) an active-hydrogen containing composition comprising an oligomeric polyol having a hydroxyl number of about 45 to about 65 mg KOH/gram, a number average hydroxyl functionality of less than about 2.7, and about 40% weight or greater oligomers.

The hydroxyl groups of the oligomeric polyol chemically react with the isocyanate groups of the polyisocyanate to form the urethane linkages in the resulting polyurethane foam. Thus, the oligomeric polyol is chemically incorporated into the polyurethane polymer.

The amount of oligomeric polyol included in the active hydrogen-containing composition may be selected based upon the desired performance of the foam. For example, in some embodiments, the active-hydrogen containing composition may comprise from about 10% to about 90% weight of the oligomeric polyol, for example, about 10% to about 60% weight oligomeric polyol, or about 15% to about 40% weight oligomeric polyol.

In some embodiments, the active-hydrogen containing composition comprises an oligomeric polyol and a petroleum-derived polyol. For example, in some embodiments, the active-hydrogen containing composition comprises about 10% to about 90% weight oligomeric polyol and about 10% to about 90% weight petroleum-derived polyol. In some embodiments, the active-hydrogen containing composition comprises about 10% to about 60% weight oligomeric polyol and about 40% to about 90% weight petroleum-derived polyol. In other embodiments, the active-hydrogen containing composition comprises about 15% to about 40% weight oligomeric polyol and about 60% to about 85% weight petroleum-derived polyol.

In some embodiments, the petroleum-derived polyol is a triol. As used herein, the term "triol" refers to a polyol that has an average of about 2.7 to about 3.1 hydroxyl groups per molecule. In a specific embodiment, the triol has a weight average molecular weight (Mw) of about 3000 grams/mole to about 3500 grams/mole. Representative examples of commercially available petroleum-derived triols include those available under the trade designations ARCOL F3040, ARCOL F3022, and ARCOL 3222 (from Bayer), PLURACOL 1385 and PLURACOL 1388 (from BASF), VORANOL 3322, VORANOL 3010, VORANOL 3136, and VORANOL 3512A (from Dow).

Polyisocyanates

Representative examples of useful polyisocyanates include those having an average of at least about 2.0 isocyanate groups per molecule. Both aliphatic and aromatic polyisocyanates can be used. Examples of suitable aliphatic polyisocyanates include 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, 1,5-diisocyanato-3,3,5-trimethylcyclohexane, hydrogenated 2,4-and/or 4,4'-diphenylmethane diisocyanate ($H_{12}$MDI), isophorone diisocyanate, and the like. Examples of suitable aromatic polyisocyanates include 2,4-toluene diisocyanate (TDI), 2,6-toluene diisocyanate (TDI), and blends thereof, 1,3- and 1,4-phenylene diisocyanate, 4,4'-diphenylmethane diisocyanate (including mixtures thereof with minor quantities of the 2,4'-isomer) (MDI), 1,5-naphthylene diisocyanate, triphenylmethane-4,4',4"-triisocyanate, polyphenylpolymethylene polyisocyanates (PMDI), and the like. Derivatives and prepolymers of the foregoing polyisocyanates, such as those containing urethane, carbodiimide, allophanate, isocyanurate, acylated urea, biuret, ester, and similar groups, may be used as well.

The amount of polyisocyanate preferably is sufficient to provide an isocyanate index of about 60 to about 120, preferably about 70 to about 110, and, in the case of high water formulations (i.e., formulations containing at least about 5 parts by weight water per 100 parts by weight of other active hydrogen-containing materials in the formulation), from about 70 to about 90. As used herein the term "isocyanate index" refers to a measure of the stoichiometric balance between the equivalents of isocyanate used to the total equivalents of water, polyols and other reactants. An index of 100 means enough isocyanate is provided to react with all compounds containing active hydrogen atoms.

Polyurethane Catalysts

Examples of useful polyurethane catalysts include tertiary amine compounds and organometallic compounds. Specific examples of useful tertiary amine compounds include triethylenediamine, N-methylmorpholine, N-ethylmorpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously used in an amount from about 0.01 to about 5, preferably from about 0.05 to about 2 parts per 100 parts by weight of the active hydrogen-containing materials in the formulation.

Specific examples of useful organometallic catalysts include organic salts of metals such as tin, bismuth, iron, zinc, and the like, with the organotin catalysts being preferred. Suitable organotin catalysts include dimethyltindilaurate, dibutyltindilaurate, stannous octoate, and the like. Other suitable catalysts are taught, for example, in U.S. Pat. No. 2,846,408, which is hereby incorporated by reference. Preferably, about 0.001 to about 1.0 parts by weight of an organometallic catalyst is used per 100 parts by weight of the active hydrogen-containing materials in the formulation. Blends of catalysts may also be used.

Blowing Agents

The blowing agent generates a gas under the conditions of the reaction between the active hydrogen compound and the polyisocyanate. Suitable blowing agents include water, liquid carbon dioxide, acetone, methylene chloride, and pentane, with water being preferred.

The blowing agent is used in an amount sufficient to provide the desired foam density and IFD. For example, when water is used as the only blowing agent, from about 0.5 to about 10, preferably from about 1 to about 8, more preferably from about 2 to about 6 parts by weight, are used per 100 parts by weight of other active hydrogen-containing materials in the formulation.

Other Additives

Other additives that may be included in the formulation include surfactants, catalysts, cell size control agents, cell opening agents, colorants, antioxidants, preservatives, static dissipative agents, plasticizers, crosslinking agents, flame retardants, and the like.

Examples of useful surfactants include silicone surfactants and the alkali metal salts of fatty acids. The silicone surfactants, e.g., block copolymers of an alkylene oxide and a dimethylsiloxane, are preferred, with "low fog" grades of silicone surfactants being particularly preferred.

In some cases, a static dissipative agent may be included in the formulation during foam preparation, or used to treat the finished foam. Useful examples include non-volatile, ionizable metal salts, optionally in conjunction with an enhancer compound, as described in U.S. Pat. Nos. 4,806,571, 4,618, 630, and 4,617,325. Of particular interest is the use of up to about 3 weight percent of sodium tetraphenylboron or a sodium salt of a perfluorinated aliphatic carboxylic acid having up to about 8 carbon atoms.

Manufacturing of Polyurethane Foams

Polyurethane foams of the invention can be manufactured using known techniques for producing conventional slabstock (i.e., free-rise) and molded foams. In slabstock processes, the polyurethane reactants are mixed together and are poured onto a conveyor where the reacting mixture rises against its own weight and cures to form a slabstock bun having a nominal rectangular cross-section. The resulting slabstock bun can be cut into the desired shape to suit the end-use. In a molded foam process the reactants are mixed and dispensed into a mold where they react to fill the mold and assume the shape of the mold cavity. After the molded foam is cured, the mold is opened and the molded polyurethane article is removed.

Slabstock polyurethane foams can be manufactured using conventional slabstock foaming equipment, for example, commercial box-foamers, high or low pressure continuous foam machines, crowned block process, rectangular block process (e.g., Draka, Petzetakis, Hennecke, Planiblock, EconoFoam, and Maxfoam processes), or verti-foam process. In some embodiments, the slabstock foam is produced under reduced pressure. For example, in variable pressure foaming (VPF), the complete conveyor section of the foaming machine is provided in an airtight enclosure. This technique allows for the control of foam density and the production of foam grades that may otherwise be difficult to produce. Details of such slabstock foaming processes are reported, for example, in Chapter 5 of *Flexible Polyurethane Foams*, edited by Herrington and Hock, ($2^{nd}$ Edition, 1997, Dow Chemical Company).

In some instances, it is desirable to post-cure the foam after initial forming (and demolding in the case of molded foam) to develop optimal physical properties. Post-curing may take place under ambient conditions, for example, for a period of about 12 hours to 7 days; or at elevated temperature, for example, for a period of about 10 minutes to several hours.

The foams can be used in a variety of applications, for example, they may be incorporated into seat components (e.g. seat cushions, seat backs, arm rests, and the like) for use in motor vehicles or furniture.

Properties of Polyurethane Foams

Slabstock polyurethane foams of the invention exhibit a number of desirable properties including, for example, adjustable support factor, reduced skin thickness, improved color-fastness, low odor, improved hand touch, reduced density spread, reduced IFD spread, improved flame resistance, and improved comfort as measured by pressure mapping.

Tensile, Tear, and Elongation

It is known in the slabstock foam industry that in slabstock foam, the use of polyols with a low number average hydroxyl functionality or containing a significant amount of monofunctional species will cause chain termination of the polyurethane polymer which may degrade the tensile, tear, elongation, and durability of the resulting slabstock foam. Surprisingly, slabstock polyurethane foams of the invention exhibit only a moderate degradation from the low number average hydroxyl functionality species that are present.

In some embodiments, the polyurethane foams of the invention comprise an active hydrogen containing composition comprising at least 10 PPH of oligomeric polyol, and the polyurethane foam has a percent tensile strength reduction (i.e., a reduction relative to a control formulation) that is equal to or less than that calculated from the following equation:

$$\% \text{ Tensile Strength Reduction} = m \times (\text{PPH of oligomeric polyol})$$

when the tensile strength is measured using ASTM3574 (modified to a minimum 3 day cure time) on a slabstock foam having a density of about 1.5 lb/ft$^3$ and a 25% IFD of about 23 N/323 cm$^2$. In some embodiments, m is equal to 0.89. In other embodiments, m is equal to 1.0 or 1.1.

In some embodiments, the polyurethane foams of the invention comprise an active-hydrogen containing composition comprising at least 10 PPH of oligomeric polyol, and the polyurethane foam has a percent tear strength reduction (i.e., a reduction relative to a control formulation) that is equal to or less than that calculated from the following equation:

$$\% \text{ Tear Strength Reduction} = 1.40 \times (\text{PPH of oligomeric polyol})$$

when the tear strength is measured using ASTM 3574 (modified to a minimum of 3 day cure time) on a slabstock foam having a density of about 1.5 lb/ft$^3$ and a 25% IFD of about 23 N/323 cm$^2$.

In some embodiments, the polyurethane foams of the invention comprise an active-hydrogen containing composition comprising at least 10 PPH of an oligomeric polyol and the polyurethane foam has a percent elongation reduction (i.e., a reduction relative to a control formulation) that is less than or equal to that calculated from the following equation:

$$\% \text{ Elongation Reduction} = 1.36 \times (\text{PPH of oligomeric polyol})$$

when the elongation is measured using ASTM 3574 (modified to a minimum of 3 day cure time) on a slabstock foam having a density of about 1.5 lb/ft$^3$ and a 25% IFD of about 23 N/323 cm$^2$.

In some embodiments, the polyurethane foam comprises an active-hydrogen composition comprising at least 10 PPH of an oligomeric polyol having a number average hydroxyl functionality less than about 2.7, wherein a polyurethane foam having a density of about 1.5 lb/ft$^3$ has a tensile strength of at least about 85 kPa.

Support Factor

In some embodiments, the slabstock polyurethane foams of the invention exhibit an increased support factor as compared to a control formulation that does not include the oligomeric polyol. As used herein the term "support factor" refers to the ratio of the 65% IFD to the 25% IFD for a slabstock foam sample as shown in the equation below. Support factor is also sometimes referred to as "sag factor" or "modulus" and gives an indication of the cushioning quality of the slabstock foam. As the support factor increases, the slabstock foam becomes more resistant to bottoming out.

$$\text{Support Factor} = (\text{Firmness at 65\% IFD})/(\text{Firmness at 25\% IFD})$$

In the equation, "IFD" refers to "indentation force deflection value" which is a measure of the load bearing quality of a foam. IFD is typically expressed in Newtons per 323 square centimeters (N/323 cm$^2$) at a given percentage deflection of the foam. The higher the force, the firmer the slabstock foam. To obtain IFD, a 323 square centimeter circular plate is pushed into the top surface of a foam sample, stopping at a given deflection, and reading a force on the scale. For example, a 25% IFD of 150 means that a force of 150 N/323 cm$^2$ is required to compress a 100 mm thick sheet of foam to a thickness of 75 mm.

In some embodiments, the slabstock polyurethane foams of the invention exhibit a support factor that can be controlled by varying the amount of oligomeric polyol that is present in the slabstock foam. Advantageously, the support factor of the slabstock foam can be controlled independent of the grade of the slabstock foam. By increasing the amount of oligomeric polyol, the support factor also increases. This allows the foam manufacturer to control the support factor by adjusting the amount of oligomeric polyol and petroleum-derived polyol in the formulation. In embodiments of the invention, the support factor may be 1.5 or greater, for example, 1.6 or greater, 1.7 or greater, 1.8 or greater, 1.9 or greater, 2.0 or greater, 2.1 or greater, 2.2 or greater, 2.3 or greater. In some embodiments, the support factors ranges from about 1.7 to 2.2.

When the active-hydrogen containing composition comprises an oligomeric polyol and a petroleum-derived polyol, the support factor of the polyurethane foam can be controlled by controlling the relative amounts of oligomeric polyol and petroleum-derived polyol. For example, in some embodiments, the amount of oligomeric polyol ranges from about 10% to about 90% weight and the amount of petroleum-derived polyol ranges from about 10% to about 90% weight. In other embodiments, amount of oligomeric polyol ranges from about 10% to about 60% weight and the amount of petroleum-derived polyol ranges from about 40% to about 90% weight. In yet other embodiments, the amount of oligomeric polyol ranges from about 15% to about 40% weight and the amount of petroleum-derived polyol ranges from about 60% to about 85% weight.

Skin Thickness

In some embodiments, the flexible slabstock polyurethane foams of the invention have a thin or low density outer skin. As used herein, the term "skin" refers to the high density outer layer that forms on a slabstock foam bun. Typically, the skin layer of the bun is cut off and it is discarded as waste or scrap. Minimizing the thickness, or density, of the outer skin results in an improved net yield of foam because less foam has to be cut off and discarded. Skin density may be measured, for example, by measuring the density of a section of the outer layer of the foam bun.

In some embodiments, the skin density (i.e., density of the outer one inch (1") of foam) of a foam bun comprising an oligomeric polyol is reduced by about 20% or greater as compared to a control formulation that does not include the oligomeric polyol. In some embodiments, the skin density of a foam bun comprising the oligomeric polyol is reduced by about 0.25 lb/ft$^3$ or greater as compared to a control formulation that does not include the oligomeric polyol. In other embodiments, the skin density is reduced by about 0.50 lb/ft$^3$ or greater, or about 0.75 lb/ft$^3$ or greater, or even about 1.0 lb/ft$^3$ or greater as compared to a control formulation that does not include the oligomeric polyol.

Color Fastness

Another useful attribute of the foams is their color fastness, which refers to their ability to retain their as-manufactured white color over extended periods of time upon exposure to light under ambient conditions. Preferably, the foams, upon exposure to light under ambient conditions for a period of 6 weeks in the absence of an ultraviolet stabilizer, have a specular reflectance characterized by an (L) value of at least 70 units, a (b) value of no greater than 25 units, and, preferably, an (a) value of no greater than 4 units. In addition, the foams, upon manufacture, preferably have (L), (a), and (b) values meeting the enumerated values, and these values do not change substantially upon exposure to light under the conditions described above. In particular, the (L) and (b) values do not change by more than 14 units, and the (a) value does not change by more than 5 units.

Odor of Polyol and Polyurethane Foam

In some embodiments, the polyurethane foams of the invention exhibit mild odor that is at least as good as, or better than, control foams prepared using petroleum-derived polyols rather than the oligomeric polyol. The mild odor makes the foams acceptable for commercial foam production. Odor may be measured, for example, by using human test panels or by measuring the amount of certain odor-producing compounds that may be present in the oligomeric polyol. Examples of odor-producing compounds include lipid oxidation products, which are typically aldehyde compounds, for example, hexanal, nonanal, and decanal. In some embodiments, the oligomeric polyol or polyurethane foam has about 30 ppm or less hexanal, for example, about 25 ppm or less, about 20 ppm or less, about 15 ppm or less, about 10 ppm or less, about 5 ppm or less, or about 1 ppm or less hexanal. In some embodiments, the oligomeric polyol or polyurethane foam has about 30 ppm or less nonanal, for example, about 25 ppm or less, about 15 ppm or less, about 10 ppm or less, about 5 ppm or less, or about 1 ppm or less nonanal. In some embodiments, the oligomeric polyol or polyurethane foam has about 20 ppm or less decanal, for example about 15 ppm or less, about 10 ppm or less, about 5 ppm or less, or about 1 ppm or less decanal. In some embodiments, the combined amount of hexanal, nonanal, and decanal in the oligomeric polyol or polyurethane foam is about 80 ppm or less, for example, about 70 ppm or less, about 60 ppm or less, about 50 ppm or less, about 40 ppm or less, about 30 ppm or less, about 20 ppm or less, about 10 ppm or less, about 5 ppm or less, or about 3 ppm or less.

Hand Touch

In some embodiments, the foams of the invention have improved hand touch as compared to a control formulation that does not include the oligomeric polyol. As used herein the term "hand touch" refers to the feel of polyurethane foam as a human hand is rubbed lightly over its surface. If the foam is harsh or rough to the touch, it is described as having "poor hand touch." If the foam has a smooth or velvet-like feeling, it is described as having "good hand touch". Although hand touch is a qualitative property, it has been observed that improved hand touch correlates well with a decrease in the measured 5% IFD for comparative slabstock polyurethane foam samples. That is, as the 5% IFD for a sample decreases, the hand touch is improved.

In embodiments of the invention, the flexible slabstock polyurethane foams have a reduced 5% IFD as compared to control formulations that do not include the oligomeric polyol. For example, the 5% IFD may be reduced by about 2% or greater as compared to the control formulation. In other embodiments, the 5% IFD may be reduced by 5% or greater as compared to the control formulation.

Hand touch may also be correlated to the surface roughness of flexible slabstock polyurethane foam. Microscopically, the surface of a foam sample consists of a series of high and low points. A perthometer provides a quantitative measurement ("Ra") of the average height of these high and low points on the surface of the foam. A high Ra value indicates a rough surface correlating to poor hand touch. A low Ra value indicates a smooth surface correlating to improved hand touch. Ra for a slabstock polyurethane foam can be measured using a perthometer, for example, those commercially available from Mahr GmbH, Göttingen, Germany.

Hand touch may also be correlated to the average cell size (e.g., average cell diameter) of the polyurethane foam. As the average cell size decreases, the foam exhibits improved hand touch. Average cell size can be measured, for example, by manually measuring a microscopic image of the foam or by using computer software to automatically measure the cell size in a microscopic image.

Flame Retardancy

In some embodiments, the foams of the invention have improved flame retardancy as compared to a control formulation that does not include the oligomeric polyol. Flame retardancy may be tested, for example, in accordance with Technical Bulletin 117, "Requirements, Test Procedure and Apparatus for Testing the Flame Retardance of Resilient Filling Materials Used in Upholstered Furniture" (March 2000). Flame retardancy is typically improved by the addition of one or more flame retardancy agents, for example, halogenated phosphate, alumina trihydrate, or melamine. Typically, such agents are added to the polyurethane composition in an amount ranging from about 6% to 10% by weight halogenated phosphate or up to about 50% by weight alumina trihydrate or melamine.

IFD Gradient in Slabstock Buns

Production buns of flexible slabstock foam are typically quite large, for example, about 7 feet wide, about 4' tall, and up to about 300 feet in length. In order to make furniture cushions having desirably constant properties, it is preferred to have minimal variation in hardness (e.g., as measured by 25% IFD) and density across the bun of slabstock foam. Polyurethane foams of the invention have been observed to have reduced variation in 25% IFD as compared to a control formulation that does not include an oligomeric polyol.

Water Resistance

In some embodiments, the slabstock polyurethane foams of the invention exhibit improved water resistance or increased hydrophobicity as compared to a control formulation that does not include the oligomeric polyol. Improved water resistance is important, for example, in outdoor applications and in marine applications. The water resistance or hydrophobicity of a slabstock foam can be measured, for example, by placing a measured amount of water on a surface of the foam and measuring the period of time it takes for the water to be absorbed into the cellular structure of the foam. A higher absorption time is characteristic of a foam that has increased water resistance or hydrophobicity. In some embodiments, the water absorption time of foams of the invention are increased by about 20% or more, for example, about 30% or more, about 40% or more, or about 50% or more as compared to a control foam that does not include the oligomeric polyol.

Soft Feel

In some embodiments, the polyurethane foams of the invention have a lower 5% IFD while maintaining about the same 25% IFD when compared to a control formulation that does not include the oligomeric polyol. This desirable balance of 5% IFD and 25% IFD may allow a reduction in the amount of polyester (PET) fiber used in furniture cushions made from the polyurethane foams of the invention. Specifically, the low 5% IFD provides the foam with a softer feel, which has heretofore been provided by wrapping the polyurethane foam with soft polyester fiber.

The invention will be further illustrated with reference to the following examples which are intended to aid in the understanding of the present invention, but which are not to be construed as a limitation thereof.

EXAMPLES

Abbreviations

Acid Value (AV)—also known as acid number, measured in (mg KOH/gram polyol).

Iodine Value (IV)—a measurement of the amount of double bonds in a substance expressed in terms of the number of centigrams of iodine ($I_2$) that reacts with a gram of the substance.

Hydroxyl Number (OH Number)—hydroxyl number, measured in mg KOH/gram polyol.

Fn—number average hydroxyl functionality expressed in number of hydroxyl groups per molecule. Fn is calculated using the equation Fn=(OH#/56)*(Mn/1000), where Mn is measured from vapor pressure osmometry.

EOC—epoxide oxygen content (% oxygen from epoxide).

Mn (GPC)—number average molecular weight in (grams/mole) as measured by GPC.

Mn (LS)—number average molecular weight in (grams/mole) as measured by light scattering.

Mn (VPO)—number average molecular weight in (grams/mole) as measured by vapor pressure osmometry.

EW—hydroxyl equivalent weight calculated as (Mn/Fn)

Mw (LS)—weight average molecular weight in (grams/mole) as measured by light scattering.

Monomer (Mon)—percent weight of monomer in the polyol.

Dimer (Dim)—percent weight of dimmers in the polyol.

Trimer (Trim)—percent weight of trimer in the polyol.

Tetramer+(Tetr+)—percent weight of tetramer and higher order oligomers in the polyol.

% Oligomer—total percent weight of all dimer, trimer, tetramer, and higher order oligomers.

g'M—a GPC measure of the hydrodynamic diameter of the polyol by GPC that is used to characterize the extent of oligomerization relative to a styrene standard. g'M decreases as oligomerization increases.

Viscosity—viscosity of a substance measured in Pa·s at 25° C.

CS=Compression Set expressed as a percentage.

PV=peroxide value as measured by AOCS method Cd 8b-90 and reported in (meq peroxide/1000 grams sample).

B-Side Masterbatch—The premixture of polyol(s), surfactant(s), crosslinker(s), catalyst(s), additive(s) and blowing agent(s) that will be later combined with a desired polyisocyanate to initiate a foam producing reaction.

Foam Odor—In some cases, immediately after a foam is made, each foam was rated for its odor characteristics. A normal rating was assigned to foams exhibiting an odor no different from that normally expected from freshly prepared foam using conventional technology. In other examples, the foam sometimes took on a notable odor that could be traced back to the particular polyol being used. A rating of mild was assigned to those foams having a notably different but not objectionable level of odor. A rating of strong indicates that the odor was different and present at such a level that most observers would object to it.

Foam Tightness—A subjective assessment of how closed cell or open cell a foam is. Tightness infers that the foam is more closed cell than open.

Loadbearing Characteristics—A collective term used to refer to the results found in testing the loadbearing capacity of a flexible foam. The normally reported data include the 25% and 65% indentation force deflection values.

MDI—methylene bis(phenylisocyanate).

Sag Factor—a number calculated as the ratio of the 65% indentation force deflection value to the 25% indentation force deflection value.

TDI—toluene diisocyanate.

Materials:

The following materials were used in Examples 1-14:

Arcol® F-3022—a petroleum-derived, nominal 3000 molecular weight polyether triol made by the addition of propylene oxide and ethylene oxide to a glycerine-based initiator compound. Typical features of the commercially available product include a water-white color, terminal hydroxyls that are all secondary in nature, a hydroxyl number of approximately 56, and a 25° C. viscosity in the range of 480 mPa·s. The material reveals a very mild and characteristic polyether polyol odor. This material is available from Bayer Corporation.

Soybean oil—when mentioned in this patent soybean oil refers to commercially available oil of a refined, bleached and deodorized (RBD) grade.

Flexol®—an epoxidized soybean oil, available from Union Carbide or other commercially available brands of epoxidized soybean oil. Commercial epoxidized soybean oil typically has the following properties:

| Specification | Limit | Method |
|---|---|---|
| Oxirane, % | 6.8 min. | AOCS Cd 9-57 or ACS PER-OXI Rev. 000 |
| Acid Value (mg KOH/g) | 0.3 max. | AOCS Cd 3d-63 or Equivalent |
| Iodine Value | 1.5 max. | AOCS Cd 1-25 |
| Gardner Color | 1.0 max. | AOCS Td 1a-64 |

Dabco® BL-11—A commercial catalyst product from Air Products Corporation consisting of a 70 weight % solution of bis(dimethylaminoethyl)-ether in dipropylene glycol. Typically used as a catalyst for the blowing reaction.

Dabco® DC-5169—A commercial surfactant product from Air Products Corporation.

Dabco® 33-LV—A commercial catalyst product from Air Products Corporation consisting of a 33 weight % solution of triethylene-diamine in dipropylene glycol. Typically used as a polymerization or gelling catalyst.

DEOA—commercial grade diethanol-amine used as a foam stabilizing crosslinker.

Niax® D-19—A tin-based gelling catalyst available from GE Silicones-OSI Specialties, Inc.

Niax® Y-10184—A silicone-based surfactant available from GE Silicones-OSI Specialties, Inc. The product is designed for use in making flexible molded polyurethane foams.

Tegostab® B-2370—A commercial surfactant product from Degussa AG designed for conventional slabstock foam use.

Tegostab® B-4690 LF—A low fogging grade of surfactant commercially available from Degussa AG.

Toluene Diisocyanate—an 80/20 blend of the 2,4 and 2,6 isomers of toluene diisocyanate obtained from Bayer Corporation and identified as Grade A of their Mondur® TD-80 product.

Water—distilled water was used as an indirect blowing agent.

Example 1

Partially Epoxidized Soybean Oil A

A partially epoxidized soybean oil was prepared as follows:

A 5-liter, 3-neck, round bottom flask was equipped with temperature control, an addition funnel, reflux condenser and stirring. To this reactor system was added: 1500 grams of soybean oil (RBD grade having an Iodine Value of 131 and a viscosity of 62 mPa·s, available from Archer Daniels Midland Company); 225 grams of glacial acetic acid (available from Fisher); and 19 grams of a 50% solution of sulfuric acid in water (available from Aldrich). These ingredients were thoroughly mixed while the reactor system was brought up to a temperature of 70° C. After attaining the temperature set point, 729 grams of a 35% solution of hydrogen peroxide in water (available from Aldrich) was added from a dropping funnel over a period of 30 minutes while maintaining the 70° C. temperature set point and continuing vigorous stirring.

After an additional 60 minutes of reaction time, the contents of the reactor system were transferred to a 3 liter separatory funnel and allowed to cool down. During the cool down period, the water and crude partially epoxidized soybean oil separated into two layers. Product work-up continued by draining off this first water layer and then water washing the crude partially epoxidized soybean oil layer three separate times with 1 liter aliquots of distilled water. The washed partially epoxidized soybean oil was then isolated again and added to an Erlenmeyer flask, and 100 grams of a basic ion exchange resin (Lewatite MP-64 from Bayer) was added. This mixture was stirred for 2 hours to allow neutralization of any remaining acid. The product was then filtered to remove the ion exchange resin and subjected to a low vacuum to remove residual water.

A partially epoxidized soybean oil product was obtained having an iodine value of 83 an epoxy oxygen content (EOC) of 2.74%. A summary of the process used and values obtained can be found in TABLE 1.1.

TABLE 1.1

| | Partially Epoxidized Vegetable Oils | | | | | | | | | | |
|---|---|---|---|---|---|---|---|---|---|---|---|
| Sample | Soybean Oil (g) | Acetic Acid (g) | $H_2SO_4$ (g) | Temp (° C.) (preheat/rxn) | $H_2O_2$ 35% (g) | Ratio DB:AA:$H_2O_2$ | Time (min) | Ion Resin (g) | EOC (%) | Iodine Value | Viscosity (Pa·s at 25° C.) |
| EX1 | 1500 | 225 | 19 | 70/70 | 729 | 1:0.5:1 | 60 | 100 | 2.74 | 83 | — |

Example 2

Partially Epoxidized Soybean Oil B

A partially epoxidized soybean oil was prepared according to Example 1, except that the amounts of reactants used and timing was as listed in TABLE 2.1 for the row "EX2." A final partially epoxidized soybean oil product was obtained having characteristics as shown in TABLE 2.1.

TABLE 2.1

| Sample | Soybean Oil (g) | Acetic Acid (g) | $H_2SO_4$ (g) | Temp °C. (preheat/rxn) | $H_2O_2$ 35% (g) | Ratio DB:AA:$H_2O_2$ | Time (min) | Ion Resin (g) | EOC (%) | Iodine Value | Viscosity (Pa·s at 25° C.) |
|---|---|---|---|---|---|---|---|---|---|---|---|
| EX2 | 500 | 75 | 6.3 | 70/70 | 147 | 1:0.5:0.6 | 60 | 40 | 2.65 | 83 | — |

Example 3

Partially Epoxidized Soybean Oil C

A partially epoxidized soybean oil was prepared according to Example 1, except using the amounts of reactants and time as listed in TABLE 3.1 for the row "EX3." In addition, the hydrogen peroxide was added by a peristaltic pump at a rate of 7.5 ml/min, rather than by a dropping funnel over 30 minutes. A final partially epoxidized soybean oil product was obtained having characteristics as shown in TABLE 3.1.

TABLE 3.1

| Sample | Soybean Oil (g) | Acetic Acid (g) | $H_2SO_4$ (g) | Temp °C. (preheat/rxn) | $H_2O_2$ 35% (g) | Ratio DB:AA:$H_2O_2$ | Time (min) | Ion Resin (g) | EOC (%) | Iodine Value | Viscosity (Pa·s at 25° C.) |
|---|---|---|---|---|---|---|---|---|---|---|---|
| EX3 | 1500 | 225 | 9 | 65/70 | 600 | 1:0.5:0.73 | 3 | 75 | 3.56 | 71 | 0.16 |

Example 4

Polyol A

Polyol preparation began with the experimental setup of a 1 liter, 3-neck, round bottom flask equipped with temperature control, an addition funnel, reflux condenser and stirring. To this reactor system was added 80 grams of methanol and 0.7 grams of fluoroboric acid (as a 48% mixture with water, available from Aldrich). These ingredients were thoroughly mixed while the reactor system was brought to boiling. Then 250 grams of the partially epoxidized soybean oil prepared according to Example 1 was quickly added to the vigorously stirred reactor.

After an additional 40 minutes of reaction time, the mixture was cooled to 50-60° C., and about 15 grams of a basic ion exchange resin (Lewatite MP-64 from Bayer) was added to neutralize the acid. This mixture was stirred for 1 hour and then allowed to cool down. Product recovery continued by filtering off the solid ion exchange resin and removal of residual water and alcohol by vacuum distillation. A summary of the process and amounts of reactants used can be found in TABLE 4.1 for "EX4". A summary of the properties of the resulting oligomeric polyol may be found in TABLE 4.2 for "EX4".

TABLE 4.1

| | Vegetable Oil-Based Polyols | | | | | | |
|---|---|---|---|---|---|---|---|
| Sample | Methanol (g) | Unsaturated Epoxidized. Soy Oil (g) | Feed Oil | Catalyst (48% $HBF_4$) (g) | AMC (g) | Ratio Methanol:Epoxy groups | Ion resin (g) |
| EX4 | 80 | 250 | EX1 | 0.7 | 0 | 6:1 | 15 |
| EX5 | — | 250 | EX4 | — | 2.5 | — | — |
| EX6 | 164 | 500 | EX2 | 1.4 | 0.5 | 6:1 | 20 |
| EX7 | 454 | 1500 | EX3 | 4.1 | 1.5 | 6:1 | 60 |

TABLE 4.2

Properties of Vegetable Oil-Based Polyols

| Sample | OH Number (mg KOH/g) | EOC (%) | Iodine Value | Acid Value (mg KOH/gram) | Viscosity at 25° C. (Pa·s) | Water (%) | Color | Fn | Oliomer/ Monomer Ratio |
|---|---|---|---|---|---|---|---|---|---|
| EX4 | 98 | 0.01 | 77 | 2.4 | 0.4 | — | Yellow | — | 21:79 |
| EX5 | 100 | 0.01 | 67 | 2.5 | 0.43 | 0.027 | Dark Yellow | — | 20:80 |
| EX6 | 94 | 0.013 | 79 | 0.334 | 0.26 | — | Yellow | 1.93 | 16:84 |
| EX7 | 88 | 0.005 | 90 | 0.714 | 0.22 | 0.038 | — | 1.8 | 14:86 |

Example 5

Polyol B

A 1 liter Erlenmeyer flask was equipped with temperature control, an addition funnel, reflux condenser and stirring. 250 grams of a polyol prepared according to Example 4 and 2.5 grams of ammonium carbonate were added to the flask. The ingredients were thoroughly mixed while the reactor system was brought to 60-70° C.

After 15 minutes of stirring, the contents of the reactor system were transferred to a 1-liter separatory funnel and allowed to cool down. During the cool down period, the water and crude polyol separated into two layers. Product work-up continued by draining off this first water layer and then water washing the crude polyol layer five separate times with 500 milliliter aliquots of distilled water. The product was then subjected to a low vacuum to remove residual water. A summary may be found in TABLE 4.1 for "EX5". The final recovered oligomeric polyol had the properties as shown in TABLE 4.2 for "EX5".

Example 6

Polyol C

A polyol was prepared by following the procedure according to Examples 4 and 5, except using the amounts of reactants and time as listed in TABLE 4.1 for the row "EX6." The final recovered oligomeric polyol had the properties as shown in TABLE 4.2 for "EX6".

Example 7

Polyol D

A polyol was prepared by following the procedure according to Examples 4 and 5, except using the amounts of reactants and time as listed in TABLE 4.1 for the row "EX7." The final recovered oligomeric polyol had the properties as shown in TABLE 4.2 for "EX7".

Example 8

Polyol E

The preparation of Polyol E began with the experimental setup of a 2 liter, 3-neck, round bottom flask equipped with temperature control, an addition funnel, reflux condenser and stirring. To this reactor system was added 35.5 grams of methanol (certified A.C.S., available from Fisher) and 1.12 grams of fluoroboric acid (as a 48% mixture with water, available from Aldrich). These ingredients were thoroughly mixed while the reactor system was brought up to a temperature of 50° C. After attaining the temperature set point, 400 grams of an epoxidized soybean oil ("Flexol," available from Union Carbide) was added to the reactor. Vigorous stirring continued and the reactor temperature was increased to 90° C. After 30 minutes of reaction at these conditions, an additional 100 grams of epoxidized soybean oil ("Flexol") was added to the reactor and the reaction continued for an additional 3 hours.

After 3 hours, the reactor was cooled down to 60° C. and 15 grams of a basic ion exchange resin (Lewatite MP-64 from Bayer) was added. This mixture was allowed to stir for 1 hour to neutralize any remaining acid. The product was then filtered to remove the ion exchange resin and subjected to a low vacuum to remove residual water and solvent. In addition, under GPC analysis, the polyol showed the following composition: 47% monomer; 12% dimer; 8% trimer; and 33% tetramer & high oligomers. The properties of the final polyol obtained are shown in TABLE 8.1 for "EX8". Several other lots of Polyol E were prepared and were used in Example 10 (see, TABLE 10.1).

TABLE 8.1

Polyol Properties

| Sample | OH Number (mg KOH/g) | EOC (%) | Acid Value (mg KOH/gram) | Viscosity at 25° C. (Pa·s) | Water (%) | Mn (GPC) (grams/mole) | EW | Fn | Oligomers (%) |
|---|---|---|---|---|---|---|---|---|---|
| EX8 | 83 | 3.07 | 0.49 | 5.7 | — | 1700 | — | 2.5 | 53 |

Example 9

Polyol F

A series of polyols were produced according to the preparation of Example 8, except that 33 grams of methanol and 0.05% catalyst were used. These same conditions were repeated four times to produce four different samples. The resulting polyols had a light soy oil odor and the properties reported in TABLE 9.1 for EX9-1, EX9-2, EX9-3, and EX9-4.

TABLE 9.1

| | Polyol Properties | | | | | | | |
|---|---|---|---|---|---|---|---|---|
| Sample | OH Number (mg KOH/g) | EOC (%) | Acid Value (mg KOH/gram) | Viscosity at 25° C. (Pa·s) | Water (%) | Mn (GPC) (grams/mole) | EW | Fn | Oligomers (%) |
| EX9-1 | 53.77 | 4.23 | 0.33 | 4.0 | 0.06 | 1668 | 1044 | 1.6 | 54.73 |
| EX9-2 | 60.43 | 4.09 | 0.29 | 5.1 | 0.07 | 1758 | 929 | 1.89 | 56.9 |
| EX9-3 | 57.23 | 3.95 | 0.29 | 5.4 | 0.066 | 1777 | 980.4 | 1.81 | 58.67 |
| EX9-4 | 57.46 | 4.17 | 0.33 | 4.72 | 0 | 1759 | 976.5 | 1.8 | 56.94 |

Example 10

Foams Made Using Polyol E

Preparation of Flexible Foams (a) Preparation of Masterbatches

As a first step in the making of the molded flexible foams listed in the examples, formulation B-Side masterbatches were made by adding the various ingredients of the desired foam formulation to a 1-gallon wide mouth plastic jug. The polyols were added to the jug first and then placed on an electric, lab duty mixer equipped with a Jiffy Mixer brand, Model HS-2, mixing blade. Mixing was started and all other formulation ingredients were added in turn while the mixer continued to run. After addition of the last formulation ingredient, mixing continued for an additional 15 minutes. The masterbatch was then removed from the mixer and a 1000 milliliter wide mouth glass jar sample taken for measurement of viscosity and observation of color and clarity. The remaining masterbatch was capped and allowed to sit while other preparations for foam making were completed.

After temperature conditioning to 25° C., measurement of the masterbatch viscosity was done using a traditional rotational style, Brookfield brand, viscometer.

(b) Procedure for Mixing Ingredients and Foam Production

Foam production is begun by adding the desired amount of a formulation B-Side masterbatch to a 33-ounce poly cup (Model DMC-33, available from International Paper Company). All of the molded example foams were prepared at a toluene diisocyanate index of 105. For each formulation, the calculated amount of toluene diisocyanate was carefully weighed out into a 400-milliliter tri-pour style plastic beaker and set aside near the mixing station.

To initiate the foam producing reactions, the cup containing the B-Side masterbatch was placed on a mixing device built from a Delta ShopMaster brand, Model DP-200, 10-inch size shop drill press fitted with a 3 inch mixing blade (Conn Mixers Company; ConnBlade Brand, Model ITC, 3-inch diameter). The mixer was set to run at 1100 RPM for a total time of 30 seconds which was controlled by an electronic count down timer. Mixing was initiated by a foot switch. As the timer counted down, the beaker of toluene diisocyanate was picked up and at 6 seconds mixing time remaining, the toluene diisocyanate was quickly added to the cup.

At the end of the mixing cycle, the contents of the mixing cup were allowed to free rise. During the cure period, the center of the cup was closely observed so that a rise time for that particular formulation could be recorded.

At the end of the cure cycle, the foam was removed from the cup. The foam samples were trimmed, weighed, labeled and allowed to sit for several days at 25° C. and 50% relative humidity before testing for physical properties.

Physical Property Testing

Physical properties of the flexible foams were measured following the procedures listed in ASTM D 3574. Note that in some cases the foams were tested before the full 7 day recommended cure time.

The following section shows data from conventional slabstock foams made with different oligomeric polyol formulations. Each of the oligomeric polyols has the characteristic of having low number average hydroxyl functionality. However, the physical properties of the resulting foams were surprisingly good given previous expectations about the number average hydroxyl functionality of the polyol used.

Samples of foams made using polyol E were prepared according to the above procedure. The tables below show the foam formulations (TABLE 10.2) and physical property data (TABLE 10.3) of foams made with two different surfactants.

TABLE 10.1

| | Characteristics of Polyol E | | | | |
|---|---|---|---|---|---|
| Polyol | OH Number (mg KOH/g) | Water (%) | Acid Value (mg KOH/gram) | Viscosity at 25° C. (Pa·s) | EOC (%) |
| E-1 | 74.89 | 0.051 | 0.42 | 7.23 | 3.41 |
| E-2 | 71.88 | 0.045 | 0.55 | 5.44 | 3.53 |
| E-3 | 73.67 | 0.041 | 0.51 | 5.43 | 3.46 |

TABLE 10.2

Polyurethane Formulations

| Ingredient | 10-1 | 10-2 | 10-3 | 10-4 | 10-5 | 10-6 | Control 1 | Control 2 |
|---|---|---|---|---|---|---|---|---|
| Polyol F-3022 | 60 | 60 | 60 | 60 | 60 | 60 | 100 | 100 |
| E-1 | 40 | 40 | 0 | 0 | 0 | 0 | 0 | 0 |
| E-2 | 0 | 0 | 40 | 40 | 0 | 0 | 0 | 0 |
| E-3 | 0 | 0 | 0 | 0 | 40 | 40 | 0 | 0 |
| B-8221 (Silicone Surfactant) | 1 | 0 | 1 | 0 | 1 | 0 | 1 | 0 |
| EP-H-140 (Silicone Surfactant) | 0 | 1 | 0 | 1 | 0 | 1 | 0 | 1 |
| BL-11 (Amine) | 0.23 | 0.23 | 0.23 | 0.23 | 0.265 | 0.265 | 0.265 | 0.265 |
| K-29 (Tin Catalyst) | 0.14 | 0.14 | 0.14 | 0.14 | 0.14 | 0.155 | 0.155 | 0.155 |

TABLE 10.3

Polyurethane Physical Properties

| Sample | Density (pcf) | Resiliency (%) | 25% IFD | 65% IFD | Support Factor | CFD (kPa) | Tensile (kPa) | Elongation (%) | Tear (N/m) | Perm (cfm) | 90% CS (% loss) | Pores/Inch (PPI) |
|---|---|---|---|---|---|---|---|---|---|---|---|---|
| 10-1 | 1.49 | 28.67 | 24.39 | 39.66 | 1.63 | 2.02 | 56.45 | 73.58 | 145.0 | 1.42 | 14.90 | 15.24 |
| 10-2 | 1.57 | 29.67 | 25.72 | 48.52 | 1.89 | 2.13 | 75.53 | 94.39 | 170.0 | 3.56 | 12.29 | 50.8 |
| 10-3 | 1.48 | 28.67 | 24.26 | 40.85 | 1.68 | 1.93 | 59.16 | 79.45 | 150.0 | 1.50 | 12.25 | 20.32 |
| 10-4 | 1.57 | 31.33 | 23.42 | 48.16 | 2.06 | 2.07 | 72.12 | 94.14 | 165.0 | 2.92 | 10.28 | 76.2 |
| 10-5 | 1.49 | 26.67 | 27.25 | 46.52 | 1.71 | 2.09 | 68.04 | 88.50 | 152.5 | 0.91 | 13.33 | 27.94 |
| 10-6 | 1.53 | 31 | 25.37 | 48.19 | 1.9 | 2.24 | 86.89 | 106.74 | 197.5 | 2.92 | 10.03 | 101.6 |
| Control 1 | 1.52 | 38.36 | 25.84 | 46.08 | 1.78 | 2.85 | 122.33 | 232.52 | 514.7 | 2.75 | 47.99 | — |
| Control 2 | 1.55 | 40.63 | 26.51 | 45.73 | 1.73 | 2.55 | 127.70 | 208.62 | 519.44 | 4.27 | 15.49 | — |

Example 11

Foams made Using Polyol F

The graphs below show conventional slabstock foam physical property data with Polyol F used at various levels of incorporation. Due to the small batch size the versions of Polyol F were combined prior to using as a foam component. The polyol characteristics are reported in TABLE 11.1. The polyurethane formulations are reported in TABLE 11.2 and TABLE 11.3. The polyurethane physical properties are reported in TABLE 11.4.

TABLE 11.1

Characteristics of Polyols

| Polyol | OH Number (mg KOH/g) | Water (%) | Acid Value (mg KOH/gram) | Viscocity at 25° C. (Pa·s) | EOC (%) | Odor |
|---|---|---|---|---|---|---|
| F-1 | 53.77 | 0.064 | 0.33 | 4 | 4.23 | Light Soy |
| F-2 | 57.46 | 0.001 | 0.33 | 4.72 | 4.17 | Light Soy |
| F-3022 | 55.30 | 0.02 | 0.03 | — | — | — |

TABLE 11.2

Polyurethane Formulations

| Ingredient | 11-1 | 11-2 | 11-3 | 11-4 | 11-5 | 11-6 | 11-7 | 11-8 | 11-9 | Control |
|---|---|---|---|---|---|---|---|---|---|---|
| Polyol F-3022 | 90 | 80 | 70 | 60 | 50 | 40 | 40 | 40 | 40 | 100 |
| F-1 | 10 | 20 | 30 | 40 | 50 | 60 | 60 | 60 | 60 | 0 |
| EP-H-140 (Silicone Surfactant) | 1.0 | 1.0 | 1.0 | 1.0 | 1.0 | 1.0 | 1.0 | 1.0 | 1.0 | 1.0 |
| BL-11 (Amine) | 0.16 | 0.16 | 0.16 | 0.16 | 0.16 | 0.16 | 0.36 | 0.38 | 0.38 | 0.16 |

TABLE 11.2-continued

Polyurethane Formulations

| Ingredient | 11-1 | 11-2 | 11-3 | 11-4 | 11-5 | 11-6 | 11-7 | 11-8 | 11-9 | Control |
|---|---|---|---|---|---|---|---|---|---|---|
| K-29 (Tin Catalyst) | 0.217 | 0.217 | 0.217 | 0.217 | 0.217 | 0.217 | 0.21 | 0.21 | 0.21 | 0.22 |
| Water | 3.976 | 3.971 | 3.967 | 3.962 | 3.958 | 3.954 | 3.954 | 3.954 | 3.954 | 3.98 |
| TDI Index | 105 | 105 | 105 | 105 | 105 | 105 | 105 | 105 | 105 | 105 |
| TDI (PPH) | 49.59 | 49.56 | 49.54 | 49.51 | 49.49 | 49.47 | 49.47 | 49.47 | 49.47 | 49.61 |
| TDI Temp (° C.) | 23.2 | 23.2 | 23.2 | 23.2 | 23.2 | 23.2 | 21.9 | 21.9 | 21.9 | 21.6 |
| Batch Temp (° C.) | 17.9 | 18.4 | 18.4 | 18.4 | 18.4 | 18.4 | 17.6 | 17.3 | 17.5 | 19.1 |
| Reaction (° C.) | 19.6 | 19.9 | 19.9 | 19.9 | 19.9 | 19.9 | 19.0 | 18.8 | 18.9 | 19.9 |
| Mix Time (s) | 25 | 25 | 25 | 25 | 25 | 25 | 25 | 25 | 25 | 25 |
| Cream Time (s) | 11 | 14 | 15 | 17 | 18 | 20 | 16 | 12 | 12 | 10 |
| Top of Cup Time (s) | 45 | 47 | 53 | 57 | 65 | 69 | 45 | 41 | 40 | 42 |
| Rise Time (s) | 87 | 89 | 96 | 104 | 115 | 123 | 87 | 79 | 81 | 84 |

TABLE 11.3

Polyurethane Formulation

| Ingredient | 11-10 | 11-11 | 11-12 | 11-13 | 11-14 | Control |
|---|---|---|---|---|---|---|
| Polyol F-3022 | 90 | 80 | 70 | 60 | 50 | 100 |
| F-2 | 10 | 20 | 30 | 40 | 50 | 0 |
| EP-H-140 (Silicone Surfactant) | 1.0 | 1.0 | 1.0 | 1.0 | 1.0 | 1.0 |
| BL-11 (Amine) | 0.16 | 0.16 | 0.16 | 0.16 | 0.16 | 0.16 |
| K-29 (Tin Catalyst) | 0.217 | 0.217 | 0.217 | 0.217 | 0.217 | 0.22 |
| Water | 3.982 | 3.984 | 3.986 | 3.988 | 3.99 | 3.98 |
| TDI Index | 105 | 105 | 105 | 105 | 105 | 105 |
| TDI (PPH) | 49.65 | 49.68 | 49.72 | 49.76 | 49.79 | 49.61 |
| TDI Temp (° C.) | 22.6 | 22.6 | 22.6 | 22.6 | 22.6 | 21.6 |
| Batch Temp (° C.) | 17.6 | 17.5 | 17.5 | 17.6 | 17.6 | 19.1 |
| Reaction (° C.) | 19.2 | 19.1 | 19.1 | 19.2 | 19.2 | 19.9 |
| Mix Time (s) | 25 | 25 | 25 | 25 | 25 | 25 |
| Cream Time (s) | 11 | 13 | 15 | 17 | 19 | 10 |
| Top of Cup Time (s) | 45 | 46 | 51 | 57 | 61 | 42 |
| Rise Time (s) | 84 | 87 | 93 | 101 | 111 | 84 |

TABLE 11.4

Polyurethane Physical Properties

| Sample | Density (pcf) | Resiliency (%) | 25% IFD (N/323 cm$^2$) | 65% IFD (N/323 cm$^2$) | Support Factor | CFD (kPa) | Tensile (kPa) | Elongation (%) | Tear (N/m) | Perm (cfm) |
|---|---|---|---|---|---|---|---|---|---|---|
| 11-1 | 1.55 | 40.33 | 33.86 | 58.32 | 1.72 | 2.79 | 113.10 | 150.12 | 402.5 | 3.5 |
| 11-2 | 1.57 | 38.33 | 29.19 | 50.52 | 1.73 | 2.42 | 101.66 | 138.38 | 422.5 | 4.0 |
| 11-3 | 1.56 | 37.67 | 31.86 | 54.39 | 1.71 | 2.51 | 102.13 | 121.45 | 297.5 | 3.58 |
| 11-4 | 1.55 | 35.00 | 30.57 | 53.65 | 1.75 | 2.38 | 89.44 | 101.73 | 230.0 | 2.86 |
| 11-5 | 1.54 | 32.00 | 29.51 | 55.32 | 1.87 | 2.65 | 67.51 | 66.23 | 177.5 | 2.44 |
| 11-6 | 1.57 | 30.67 | 25.13 | 50.32 | 2.00 | 2.40 | 56.26 | 53.32 | 150.0 | 2.25 |
| 11-7 | 1.49 | 29.67 | 21.43 | 48.28 | 2.25 | — | 49.44 | 66.33 | 137.5 | 1.73 |
| 11-8 | 1.48 | 31.33 | 21.77 | 42.64 | 1.96 | — | 65.36 | 69.05 | 120.0 | 1.86 |
| 11-9 | 1.47 | 30.33 | 21.48 | 43.05 | 2.00 | — | 59.08 | 65.40 | 117.5 | 2.06 |
| 11-10 | 1.49 | 41.00 | 29.92 | 50.65 | 1.69 | — | 131.05 | 152.57 | 382.5 | 4.14 |
| 11-11 | 1.50 | 39.33 | 30.55 | 51.92 | 1.70 | — | 113.82 | 119.65 | 347.5 | 4.53 |
| 11-12 | 1.50 | 36.00 | 27.71 | 50.75 | 1.83 | — | 102.50 | 102.96 | 247.5 | 4.39 |
| 11-13 | 1.51 | 31.33 | 29.55 | 53.93 | 1.83 | — | 100.46 | 87.70 | 185.0 | 3.44 |
| 11-14 | 1.52 | 30.33 | 26.89 | 52.91 | 1.97 | — | 79.07 | 65.05 | 155.0 | 2.81 |
| Control | 1.54 | 43.83 | 29.75 | 51.04 | 1.72 | 2.80 | 119.00 | 181.00 | 519.0 | 3.96 |

Example 12

Foams made Using Polyol C

The data below shows conventional slabstock foam physical property data for foams made using a conventional petroleum-derived polyol (Arcol F-3022) and Polyol C. The polyurethane formulation is reported in TABLE 12.1. The polyurethane foam properties are shown in TABLE 12.2.

TABLE 12.1

Polyurethane Formulations

| Ingredient | 12-1 | 12-2 | 12-3 | 12-4 |
|---|---|---|---|---|
| Polyol F-3022 | 80.0 | 60.0 | 40.0 | 20.0 |
| Polyol C | 20.0 | 40.0 | 60.0 | 80.0 |
| BF-2370 | 1.0 | 1.0 | 1.0 | 1.0 |
| BL-11 | 0.235 | 0.235 | 0.235 | 0.270 |
| K-29 | 0.230 | 0.230 | 0.230 | 0.180 |
| TDI-80 | 50.80 | 52.04 | 53.28 | 54.51 |
| Water | 4.0 | 4.0 | 4.0 | 4.0 |
| TDI Index | 105.0 | 105.0 | 105.0 | 105.0 |
| TDI Temp (° C.) | 21.9 | 21.9 | 21.9 | 22.3 |
| Batch Temp (° C.) | 25.0 | 26.10 | 26.0 | 25.2 |
| Cream Time (s) | 11.0 | 12.0 | 13.0 | 14.0 |
| Top of Cup Time (s) | 30.0 | 34.0 | 39.0 | 46.0 |
| Rise time (s) | 64.0 | 71.0 | 78.0 | 80.0 |
| Polyol Odor | Good | Good | Good | Good |
| Tackiness | Great | Good | OK | — |

Example 13

Foams made Using Polyol D

The data below shows conventional slabstock foam physical property data for a foam made using a conventional petroleum-derived polyol (Arcol F-3022) and Polyol D.

The polyurethane formulation is reported in TABLE 13.1. The polyurethane foam properties are reported in TABLE 13.2.

TABLE 13.1

Polyurethane Formulation

| Ingredient | 13-1 |
|---|---|
| Polyol F-3022 | 60.0 |
| Polyol D | 40.0 |
| BF-2370 | 1.0 |
| BL-11 | 0.235 |
| K-29 | 0.230 |
| TDI-80 | 52.60 |
| Water | 4.0 |
| TDI Index | 105.0 |
| TDI Temp (° C.) | 20.8 |
| Batch Temp (° C.) | 25.7 |
| Cream Time (s) | 12.0 |
| Top of Cup Time (s) | 34.0 |
| Rise time (s) | 71.0 |
| Polyol Odor | Bad |
| Tackiness | Tacky |

TABLE 12.2

Polyurethane Properties

| Foam | 25% IFD (N/323 cm$^2$) | 65% IFD (N/323 cm$^2$) | Support Factor | Ave. Rebound (%) | Density (pcf) | Tensile (kPa) | Elongation (%) | Tear (N/m) | Air Flow (cfm) | 90% CS; % loss |
|---|---|---|---|---|---|---|---|---|---|---|
| 12-1 | 56.35 | 94.72 | 1.68 | 38 | 1.64 | 112.25 | 241.14 | 420 | 3.23 | 62.25 |
|  |  |  |  |  |  |  |  |  | 1.08 | 5.54 |
| 12-2 | 56.21 | 100 | 1.78 | 33 | 1.65 | 97.09 | 196.77 | 290 | 2.94 | 54.19 |
|  |  |  |  |  |  |  |  |  | 0.71 | 7.42 |
| 12-3 | 53.39 | 99.62 | 1.87 | 28.33 | 1.66 | 78.68 | 142.16 | 220 | 1.88 | 77.81 |
|  |  |  |  |  |  |  |  |  | 0.37 | 3.15 |
| 12-4 | 43.30 | 93.83 | 2.17 | 24.67 | 1.66 | 53.83 | 78.93 | 110 | — | — |

TABLE 13.2

| Foam | 25% IFD (N/323 cm²) | 65% IFD (N/323 cm²) | Support Factor | Ave. Rebound (%) | Density (pcf) | Tensile (kPa) | Elongation (%) | Tear (N/m) | Air Flow (cfm) | 90% CS; % loss |
|---|---|---|---|---|---|---|---|---|---|---|
| 13-1 | 29.17 | 54.39 | 1.86 | — | 1.53 | 97.85 | 166.85 | 330 | 2.59 0.15 | 35.32 8.56 |

Example 14

Foams made Using Polyol F, Color Fastness

Color Fastness Test Procedure

The color fastness testing of the foams produced was conducted according to following procedure.

1. Foam samples were exposed to either 6 weeks of ambient light or two, 8-hour periods of full sun.
2. After exposure, the color of the exposed foam was compared to control samples.
3. Foam samples were stored in black plastic bags before and after color fastness testing.

Color measurements were performed using a HunterLab Ultrascan XE Spectrophotometer equipped with a 6 inch integrating sphere. Reflectance with specular included and with specular excluded were performed in accordance with ASTM E308 with a 10 degree observer and illuminant D65. The specimen port was circular and measured 1 inch in diameter with an 8 degree viewing angle and a beam diameter of 1 inch. The reduction of data was computed from spectral data taken every 10 nm over the wavelength range from 375 nm to 750 nm. The CIE color scale was used to measure the L, a, b values.

A series of polyurethane foams were produced according the procedure described earlier, and using the formulation shown in TABLE 14.1.

TABLE 14.1

| Ingredient | Parts by Weight |
|---|---|
| Polyol F-3022 | 100-X |
| Polyol F | X |
| Water | 4.0 |
| Silicone Surfactant | 1.0 |
| Blowing Catalyst | 0.1 |
| Blowing & Gelling Catalyst | 0.2 |
| Tin Catalyst | 0.25 |
| 80/20 TDI Index | 105 |

The amount of polyol F present in the formulation was changed in order to obtain a series of polyols. The control sample included 100 parts petroleum polyol and 0 parts polyol E. Additional formulations included 10 parts, 20 parts, 30 parts, 50 parts, and 60 parts polyol E. No ultraviolet light stabilizers were added to any of the foam formulations.

The series of foams were then tested for color fastness by exposure to ambient light for six weeks. The RSEX test results are for spectrophotometric tests with the reflectance specular excluded, while the RSIN test results are with the reflectance specular included. The results are reported in TABLE 14.2

TABLE 14.2

| Parts Polyol F | RSEX (L*) | RSIN (L*) |
|---|---|---|
| 0 (Control) | 82 | 82.2 |
| 10 | 84 | 84 |
| 20 | 86 | 86 |
| 30 | 88 | 88 |
| 40 | 89.4 | 88.9 |
| 50 | 90 | 90.4 |
| 60 | 90.8 | 91.4 |

The L* value is a measure of the light reflected, and the scale is from a maximum L* of 100, to a minimum L* of 0, or completely black. Thus, the higher the L* value, the lighter the sample. As can be seen, increasing the oligomeric polyol in the flexible polyurethane foams significantly improves the color fastness as compared to petroleum-derived flexible polyurethane foams without the use of UV stabilizers. Flexible polyurethane foams prepared using Polyol E retained their initial white color better than the foam prepared from a petroleum-derived polyether polyol when exposed to light under ambient conditions for 6 weeks. In addition, flexible polyurethane foams prepared using Polyol E also retained their initial white color better than the foam prepared from a petroleum-derived polyether polyol when exposed to direct sunlight.

Ingredient List for Examples 15-24

ARCOL F-3020: a petroleum-derived, nominal 3000 molecular weight triol having a hydroxyl number of 54.5 to 57.5 mg KOH/g and an acid value of 0.02 mg KOH/gram (from Bayer).

B-2130: a petroleum derived primary hydroxyl terminated graft polyether triol having an hydroxyl number of 23.0 to 26.0 and containing approximately 31% solids of copolymerized styrene and acrylonitrile.

DABCO BL-11: a blowing catalyst consisting of 70% bis(dimethylaminoethyl)ether and 30% dipropylene glycol (from Air Products).

DABCO BL-13: a blowing catalyst consisting of 23% bis(dimethylaminoethyl)ether and 77% dipropylene glycol (from Air Products).

CP-2: tris(1,3-dichloro-2-propyl)-phosphate flame retardant (from Gulbrandsen Co.).

DOP: dioctyl phthalate.

EPOXOL 7-4: a fully epoxidized soybean oil (from American Chemical Systems).

FILLER: calcium carbonate.

FR-550: phosphorous-bromine flame retardant (from Great Lakes Chemical).

K-29: stannous octoate catalyst (from Degussa).

L-650: silicone surfactant for flame retardant foams (from GE Silicones).

L-5770: silicone surfactant (from GE Silicones).

MELAMINE: flame retardant (from BASF).

P-945: a 4800 molecular weight triol (from BASF).

P-4600: a secondary hydroxyl-terminated graft polyether triol having a hydroxyl number of 27.1 to 30.1 and containing approximately 42% solids of copolymerized styrene and acrylonitrile.

T-9: stannous octoate (from Air Products).

TD-33: an amine catalyst consisting of 33% triethylene diamine in 67% dipropylene glycol (from Air Products).

TDI: toluene diisocyanante.

RC-6366: amine catalyst comprising 70% bis(2-dimethylamine ethyl)ether and 30% dipropylene glycol (from RheinChemie).

WATER: distilled water.

Example 15

Preparation of Oligomeric Polyols (12 Liter Apparatus)

A 5 neck, 12 liter flask was equipped with a mechanical stirrer, thermocouple, heating mantle/controller, cooling coil, peristaltic pump, and nitrogen feed. To the flask was charged 7000 grams of epoxidized soybean oil (EPOXOL 7-4) and 280 grams of methanol. In a separate container, a catalyst solution was prepared by mixing 7.62 grams of $HBF_4$ (48% in water) with 35.0 grams of methanol. With water flowing through the condenser, the contents of the reaction mixture was heated at 55° C. and was stirred at a high rate. Using the syringe pump, the $HBF_4$ catalyst solution was added to the flask at a rate of 0.138 ml/min to provide a total catalyst addition time of about 6 hours. The catalyst was added to the reaction mixture through a catalyst addition tube that was positioned near the lower stirrer blade. When the temperature began to rise, water was circulated through the cooling coil to maintain a temperature of 55° C.±2° C. in the reaction mixture. The reaction was monitored hourly by measuring the EOC. The addition of catalyst was stopped when the EOC reached 3.35% to 4.40%. The catalyst addition tube was then flushed with about 2-3 ml methanol and was removed from the flask. The reaction was monitored at 15-minute intervals until the catalyst EOC remained constant. The target for the final product was 4.25% EOC. The resulting product was then distilled at about 80° C. and ≦4 Torr to remove any unreacted methanol. Properties of the oligomeric polyols are reported in TABLE 15.1.

TABLE 15.1

| Polyol | OH Number | Acid Value | Water (%) | Mn (grams/mole) (VPO) | Fn (VPO) | Mn (grams/mole) (LS) | Mw (LS) (grams/mole) | Mw/Mn |
|---|---|---|---|---|---|---|---|---|
| 15-1 | 58.03 | 0.42 | 0.09 | 1763 | 1.84 | — | — | — |
| 15-2 | 62.56 | 0.44 | 0.09 | 1844 | 2.06 | 3206 | 32180 | 10.04 |
| 15-3 | 66.19 | 0.56 | 0.07 | 1687 | 1.99 | — | — | — |
| 15-4 | 63.42 | 0.43 | 0.08 | 1771 | 2.03 | — | — | — |
| 15-5 | 59.80 | 0.42 | 0.05 | 1686 | 1.80 | 4537 | 54670 | 12.05 |
| 15-6 | 54.16 | 0.43 | 0.09 | 1880 | 1.81 | 5396 | 72420 | 13.42 |
| 15-7 | 62.88 | 0.45 | 0.03 | 2057 | 2.31 | 7247 | 475400 | 65.60 |
| 15-8 | 57.75 | 0.24 | 0.05 | 1954 | 2.01 | 1546 | 7883 | 5.10 |
| 15-9 | 59.53 | 0.26 | 0.04 | 2007 | 2.13 | 1519 | 8338 | 5.49 |
| 15-10 | 62.17 | 0.33 | 0.03 | 1972 | 2.18 | 2089 | 13340 | 6.39 |
| 15-11 | 55.63 | 0.30 | 0.03 | 1695 | 1.68 | 1611 | 6928 | 4.30 |
| 15-12 | 58.81 | 0.28 | 0.04 | 1784 | 1.87 | 1567 | 9294 | 5.93 |
| 15-13 | 62.56 | 0.44 | 0.09 | 1844 | 2.06 | 3206 | 32180 | 10.04 |

| Polyol | g'M | Viscosity. | PV | Mon | Dim | Trim | Tetr+ | EOC (%) | % Olig |
|---|---|---|---|---|---|---|---|---|---|
| 15-1 | — | 3.80 | — | 43.4 | 11.8 | 7.3 | 37.5 | 4.21 | 56.6 |
| 15-2 | 0.53 | 4.65 | 3.9 | 41.7 | 11.5 | 7.5 | 39.3 | 4.22 | 58.3 |
| 15-3 | — | 4.71 | — | 40.6 | 11.4 | 7.3 | 40.8 | 4.13 | 59.4 |
| 15-4 | — | 4.04 | — | 42.9 | 12.0 | 7.7 | 37.4 | 4.21 | 57.1 |
| 15-5 | 0.33 | 4.48 | — | 41.8 | 11.5 | 7.4 | 39.3 | 4.29 | 58.2 |
| 15-6 | 0.31 | 9.78 | 0.8 | 36.8 | 9.3 | 6.5 | 47.4 | 4.29 | 63.2 |
| 15-7 | 0.06 | 6.85 | 1.4 | 39.5 | 11.4 | 7.6 | 41.5 | 4.04 | 60.5 |
| 15-8 | 1.29 | 3.84 | 3.8 | 42.0 | 11.1 | 7.6 | 38.7 | 4.25 | 58.0 |
| 15-9 | 1.23 | 4.11 | 1.5 | 41.2 | 11.8 | 7.7 | 39.3 | 4.23 | 58.9 |
| 15-10 | 1.05 | 5.87 | 1.5 | 37.8 | 10.6 | 7.0 | 44.6 | 4.07 | 62.2 |
| 15-11 | 1.27 | 3.28 | 1.5 | 43.9 | 11.7 | 7.9 | 36.5 | 4.38 | 56.1 |
| 15-12 | 1.11 | 4.73 | 1.9 | 39.9 | 11.2 | 7.3 | 41.6 | 4.21 | 60.1 |
| 15-13 | 0.53 | 4.65 | 3.9 | 41.7 | 11.5 | 7.5 | 39.3 | 4.22 | 58.3 |

Example 16

Preparation of Oligomeric Polyols.

The large-scale reaction set-up consisted of a 6000 gallon continuous stirred tank reactor equipped with a glycol cooling jacket and pump-around loop with a heat exchanger. Prior to adding reactants, the stirred tank reactor was flushed with nitrogen gas to inert the vapor head space. Then, the epoxidized soybean oil was added to the reactor in the amount shown in TABLE 16.1. Following this, the methanol was added to the reactor in the amount shown in TABLE 16.1. The epoxidized soybean oil and methanol were thoroughly mixed in the reactor so as to minimize local concentration gradients and the resulting mixture was heated to a temperature of about 55° C. Separately, a catalyst solution was prepared by mixing 1 part of aqueous $HBF_4$ solution (48% weight in water) with 4.6 parts methanol. Approximately 218 lbs of catalyst solution was fed into the stirred tank reactor over a period of about 5.5 hours. The heat of reaction was removed by circulating chilled glycol through the cooling jacket. At about peak exotherm, additional heat was removed by pumping the reaction mixture through the pump-around loop/heat exchanger. After all of the catalyst solution was added, the reactor was maintained at temperature for approximately 30 minutes. During the course of the reaction, the change in EOC was monitored. At the end of the reaction, the remaining methanol was removed by vacuum stripping. The resulting oligomeric polyol was then conditioned by sparging with nitrogen gas. The properties of the oligomeric polyols are reported in TABLE 16.2.

TABLE 16.1

| Polyol | Epoxidized Soybean Oil | Methanol |
| --- | --- | --- |
| 16-1 | 36,332 lbs. | 1452 lbs. |
| 16-2 | 36,332 lbs. | 1452 lbs. |
| 16-3 | 36,332 lbs. | 1452 lbs. |

TABLE 16.2

| Polyol | OH Number | Acid Value | % Water | Mn (grams/mole) (VPO) | Fn (VPO) | Mn (grams/Mole) (LS) | Mw (grams/mole) (LS) | Mw/Mn |
| --- | --- | --- | --- | --- | --- | --- | --- | --- |
| 16-1 | 59.52 | 0.30 | 0.07 | 1864 | 1.98 | 1674 | 8345 | 4.98 |
| 16-2 | 59.52 | 0.30 | 0.07 | 1864 | 1.98 | 1674 | 8345 | 4.98 |
| 16-3 | 59.52 | 0.30 | 0.07 | 1864 | 1.98 | 1674 | 8345 | 4.98 |

| Polyol | g'M | Viscosity. | PV | Mon | Dim | Trim | Tetr+ | EOC (%) | % Olig |
| --- | --- | --- | --- | --- | --- | --- | --- | --- | --- |
| 16-1 | 1.17 | 2.95 | 2.2 | 41.4 | 11.4 | 7.5 | 39.7 | 4.49 | 58.6 |
| 16-2 | 1.17 | 2.95 | 2.2 | 41.4 | 11.4 | 7.5 | 39.7 | 4.49 | 58.6 |
| 16-3 | 1.17 | 2.95 | 2.2 | 41.4 | 11.4 | 7.5 | 39.7 | 4.49 | 58.6 |

Example 17

Preparation of Flexible Slabstock Foams

Step 1: Procedure for Preparing B-Side

The polyols listed in TABLE 17.1 were weighed into a 400 ml plastic beaker that was positioned on an electric scale. Next, the formulation required amount of silicone surfactant and amine catalyst were added to the beaker. Next, the formulation required amount of stannous octoate and water were added to the batch. The temperature of the B-side was adjusted so that upon mixing with the polyisocyanate the combined mixture had a temperature of 19.2° C.±0.3° C. The batch was mixed with an electric, lab duty mixer (Delta Shop-Master brand, Model DP-200, 10 inch shop drill press) equipped with a 2" diameter mixing blade (ConnBlade Brand, Model ITC from Conn Mixers Co.) for 19 seconds at 2340 rpm's. Separately, the formulation required amount of TDI was weighed out into a 50 ml plastic beaker and was set near the mixing station. The TDI was then added to the polyol mixture and was mixed for 6 seconds. Following this, the mixture was poured into an 83 oz cup and was allowed to free rise. During the free rise period, the Cream Time (i.e., the time from the introduction of the TDI until start of cream rise in the cup), Top of Cup Rise Time (i.e., the time from the introduction of the TDI until the dome of the foam reaches the top of the cup), and the Total Rise Time (i.e., the time from the introduction of the TDI until there is blow-off or no more rising of the foam) were each recorded. The foam and cup were then placed into a temperature-controlled oven at 100° C. for 15 minutes to cure. At the end of the oven cure, the foam was permitted to cure overnight. After curing overnight, the foam was conditioned for 72 hours at 25° C. and 50% relative humidity before testing for physical properties. The physical property test results are reported in TABLES 17.2-17.4.

TABLE 17.1

| Ingredient | 30% Incorporation (PPH) | 40% Incorporation (PPH) | 50% Incorporation (PPH) |
| --- | --- | --- | --- |
| Polyol F-3022 | 70 | 60 | 50 |
| Oligomeric Polyol (See TABLE 15.1 and TABLE 16.2) | 30 | 40 | 50 |
| Water | 4 | 4 | 4 |
| TDI | 105 Index* | 105 Index* | 105 Index* |
| L-5770 (silicone surfactant) | 1 | 1 | 1 |
| BL-11 (amine catalyst) | 0.16 | 0.16 | 0.16 |
| K-29 (stannous Octoate) | 0.22 | 0.22 | 0.22 |

*The amount of TDI used was calculated based on the total water and the hydroxyl number of the polyol to provide an index of 105.

TABLE 17.2

(30% INCORPORATION)

| Polyol | Odor | Cream (sec) | Top Cup (sec) | Total Rise (sec) | Density (pcf) | Rebound (%) | 25% IFD (N/323 cm$^2$) | 65% IFD (N/323 cm$^2$) | Support Factor |
|---|---|---|---|---|---|---|---|---|---|
| 15-1 | − | 13 | 53 | 105 | 1.5 | 36 | 25 | 48 | 1.88 |
| 15-2 | − | 13 | 56 | 110 | 1.5 | 36 | 23 | 42 | 1.83 |
| 15-3 | − | 12 | 55 | 108 | 1.4 | 35 | 21 | 38 | 1.81 |
| 15-4 | − | 13 | 50 | 101 | 1.5 | 35 | 25 | 46 | 1.81 |
| 15-5 | + | 14 | 52 | 94 | 1.5 | 35 | 24 | 43 | 1.81 |
| 15-6 | ++ | 13 | 52 | 93 | 1.5 | 35 | 24 | 43 | 1.75 |
| 15-7 | + | 14 | 52 | 95 | 1.5 | 35 | 25 | 44 | 1.74 |
| 15-8 | ++ | 14 | 54 | 104 | 1.5 | 36 | 24 | 44 | 1.84 |
| 15-9 | ++ | 15 | 51 | 96 | 1.5 | 35 | 24 | 45 | 1.84 |
| 15-10 | ++ | 14 | 49 | 95 | 1.5 | 35 | 23 | 41 | 1.81 |
| 15-11 | ++ | 14 | 51 | 101 | 1.5 | 37 | 23 | 42 | 1.86 |
| 15-12 | ++ | 12 | 47 | 92 | 1.5 | 36 | 23 | 42 | 1.81 |
| 15-13 | − | 13 | 56 | 110 | 1.5 | 36 | 23 | 42 | 1.83 |

| Polyol | Tensile (kPa) | Elong (%) | Tear (N/m) | Air Flow (ft$^3$/min) | 90% CS (% loss) |
|---|---|---|---|---|---|
| 15-1 | 90 | 118 | 296 | 4.0 | 11.8 |
| 15-2 | 86 | 135 | 276 | 3.8 | 8.6 |
| 15-3 | 81 | 132 | 261 | 4.1 | 7.9 |
| 15-4 | 96 | 146 | 296 | 4.1 | 11.3 |
| 15-5 | 97 | 140 | 279 | 4.0 | 19.8 |
| 15-6 | 88 | 133 | 245 | 3.9 | 15.7 |
| 15-7 | 91 | 142 | 283 | 3.8 | 38.3 |
| 15-8 | 96 | 138 | 281 | 3.6 | 11 |
| 15-9 | 93 | 143 | 291 | 3.6 | 15.2 |
| 15-10 | 100 | 137 | 264 | 3.9 | 14.2 |
| 15-11 | 101 | 142 | 298 | 3.8 | 11.9 |
| 15-12 | 94 | 144 | 286 | 4.2 | 12.5 |
| 15-13 | 86 | 135 | 276 | 3.8 | 8.6 |

TABLE 17.3

(40% INCORPORATION)

| Polyol | Odor | Cream (sec) | Top Cup (sec) | Total Rise (sec) | Density (pcf) | Rebound (%) | 25% IFD (N/323 cm$^2$) | 65% IFD (N/323 cm$^2$) | Support Factor |
|---|---|---|---|---|---|---|---|---|---|
| 15-1 | − | 14 | 58 | 122 | 1.5 | 32 | 25 | 52 | 2.04 |
| 15-2 | − | 15 | 63 | 124 | 1.5 | 33 | 23 | 43 | 1.91 |
| 15-3 | − | 12 | 61 | 122 | 1.4 | 32 | 21 | 41 | 1.95 |
| 15-4 | − | 14 | 57 | 109 | 1.5 | 33 | 26 | 48 | 1.87 |
| 15-5 | + | 17 | 57 | 102 | 1.5 | 33 | 24 | 45 | 1.92 |
| 15-6 | + | 16 | 57 | 102 | 1.5 | 33 | 25 | 46 | 1.81 |
| 15-7 | + | 17 | 57 | 103 | 1.5 | 33 | 27 | 48 | 1.82 |
| 15-8 | + | 16 | 60 | 119 | 1.6 | 33 | 24 | 48 | 1.96 |
| 15-9 | + | 15 | 56 | 110 | 1.5 | 32 | 25 | 47 | 1.91 |
| 15-10 | + | 15 | 53 | 109 | 1.5 | 32 | 24 | 46 | 1.91 |
| 15-11 | + | 15 | 55 | 104 | 1.5 | 33 | 22 | 42 | 1.89 |
| 15-12 | ++ | 14 | 52 | 100 | 1.5 | 33 | 24 | 44 | 1.87 |
| 15-13 | − | 15 | 63 | 124 | 1.5 | 33 | 23 | 43 | 1.91 |

| Polyol | Tensile (kPa) | Elong (%) | Tear (N/m) | Air Flow (ft$^3$/min) | 90% CS (% loss) |
|---|---|---|---|---|---|
| 15-1 | 77 | 91 | 215 | 2.9 | 13.9 |
| 15-2 | 65 | 91 | 201 | 2.8 | 9.5 |
| 15-3 | 57 | 81 | 189 | 2.9 | 9.6 |
| 15-4 | 87 | 122 | 215 | 3.2 | 11.3 |
| 15-5 | 82 | 108 | 225 | 3.0 | 26.7 |
| 15-6 | 78 | 104 | 200 | 2.8 | 20.2 |
| 15-7 | 86 | 111 | 218 | 2.9 | 39.1 |
| 15-8 | 81 | 104 | 194 | 3.0 | 11.8 |
| 15-9 | 82 | 113 | 223 | 2.9 | 13.2 |
| 15-10 | 76 | 91 | 184 | 3.0 | 12.3 |
| 15-11 | 77 | 100 | 211 | 3.1 | 12.0 |
| 15-12 | 76 | 101 | 208 | 2.6 | 12.0 |
| 15-13 | 65 | 91 | 201 | 2.8 | 9.5 |

TABLE 17.4

| Polyol | Odor | Cream (sec) | Top Cup (sec) | Total Rise (sec) | Density (pcf) | Rebound (%) | 25% IFD (N/323 cm²) | 65% IFD (N/323 cm²) | Support Factor | Tensile (kPa) | Elong (%) | Tear (N/m) | Air Flow (ft³/min) | 90% CS (% loss) |
|---|---|---|---|---|---|---|---|---|---|---|---|---|---|---|
| 15-1 | − | 13 | 67 | 140 | — | — | — | — | — | — | — | — | — | — |
| 15-2 | − | 16 | 72 | 136 | — | — | — | — | — | — | — | — | — | — |
| 15-3 | Not tested | 16 | 71 | 141 | — | — | — | — | — | — | — | — | — | — |
| 15-4 | − | 16 | 65 | 125 | 1.6 | 30 | 23 | 49 | 2.12 | 64 | 83 | 156 | 2.4 | 13.6 |
| 15-5 | + | 18 | 66 | 117 | 1.5 | 31 | 23 | 43 | 1.90 | 79 | 93 | 163 | 2.9 | 18.8 |
| 15-6 | + | 18 | 65 | 131 | 1.6 | 30 | 26 | 51 | 1.98 | 65 | 81 | 131 | 2.4 | 14.8 |
| 15-7 | + | 17 | 63 | 111 | 1.5 | 31 | 28 | 52 | 1.88 | 77 | 88 | 169 | 2.2 | 56.4 |
| 15-8 | + | 16 | 68 | 130 | — | — | — | — | — | — | — | — | — | — |
| 15-9 | + | 16 | 58 | 111 | 1.5 | 31 | 23 | 46 | 2.02 | 64 | 81 | 168 | 2.3 | 15.3 |
| 15-10 | Not tested | 16 | 60 | — | — | — | — | — | — | — | — | — | — | — |
| 15-11 | Not tested | 16 | 52 | — | — | — | — | — | — | — | — | — | — | — |
| 15-12 | ++ | 15 | 58 | 121 | 1.4 | 31 | 19 | 41 | 2.19 | 52 | 70 | — | 2.1 | 14.5 |
| 15-13 | − | 16 | 72 | 136 | — | — | — | — | — | — | — | — | — | — |
| 16-1 | ++ | 15 | 62 | 117 | 1.5 | 31 | 22 | 45 | 2.01 | 70 | 84 | 156 | 2.2 | 15.8 |
| 16-2 | ++ | 15 | 63 | 119 | 1.5 | 32 | 22 | 46 | 2.10 | 65 | 82 | 158 | 2.4 | 15.6 |
| 16-3 | ++ | 15 | 62 | 116 | 1.5 | 31 | 23 | 46 | 2.05 | 66 | 79 | 159 | 2.3 | 14.9 |

Example 18

Flexible slabstock foam buns were prepared using a full-scale conventional slabstock foam line from MaxFoam. The foam buns were prepared using the formulations listed in TABLES 18.1-18.4. Skin density measurements were taken from each of the foam buns according to the technique described below.

TABLE 18.1

| Formulation 1 | | |
|---|---|---|
| | Formulation 1 (Control) | Formulation 1 (25%) |
| Foam Properties | | |
| Density (lbs/ft³) | 1.8 | 1.8 |
| Hardness (lbs) | 28 | 28 |
| Cal 117 | Yes | Yes |
| Ingredients | (PPH) | (PPH) |
| F-3022 | 93.5 | 68.5 |
| OLIG. POLYOL | 0 | 25.0 |
| FILLER | 3.25 | 3.25 |
| MELAMINE | 6.5 | 6.5 |
| P-945 | 6.5 | 6.5 |
| TDI | 45.42 | 45.42 |
| WATER | 3.34 | 3.34 |
| L-650 | 0.97 | 0.97 |
| T-9 | 0.24 | 0.24 |
| TD-33 | 0.04 | 0.04 |
| RC-6366 | 0.29 | 0.29 |
| ACETONE | 2.45 | 2.45 |
| CP-2 | 13.0 | 13.0 |

TABLE 18.2

| Formulation 2 | | | |
|---|---|---|---|
| | Formulation 2 (Control) | Formulation 2 (15%) | Formulation 2 (25%) |
| Foam Properties | | | |
| Density (lbs/ft³) | 1.45 | 1.45 | 1.45 |
| Hardness (lbs) | 31 | 31 | 31 |
| Call 117 Form. | No | No | No |
| Ingredients | (PPH) | (PPH) | (PPH) |
| F-3020 | 93.95 | 78.95 | 62.45 |
| OLIG POLYOL | 0 | 15.0 | 25.0 |
| FILLER | 6 | 6 | 6 |
| MELAMINE | 3.25 | 3.25 | 3.25 |
| P-945 | 3.25 | 3.25 | 3.25 |
| B-2130 | 2.80 | 2.80 | 2.80 |
| TDI | 51.10 | 51.18 | 51.27 |
| WATER | 3.93 | 3.93 | 3.93 |
| L-5770 | 0.96 | 0.96 | 0.96 |
| K-29 | 0.23 | 0.23 | 0.23 |
| RC-6366 | 0.19 | 0.19 | 0.19 |
| ACETONE | 2.60 | 2.60 | 2.60 |

TABLE 18.3

| Formulation 3 | | |
|---|---|---|
| Ingredient | Formulation 3-Control | Formulation 3 (25%) |
| Foam Properties | | |
| Density (lbs/ft³) | 1.8 | 1.8 |
| Hardness (lbs) | 25 | 25 |
| Cal 117 Formulation | Yes | Yes |
| Ingredients | (PPH) | (PPH) |
| F-3022 | 94.0 | 69.0 |
| OLIG. POLYOL | 0 | 25.0 |
| FILLER | 4.5 | 4.5 |
| MELAMINE | 6.0 | 6.0 |

TABLE 18.3-continued

| Formulation 3 | | |
|---|---|---|
| P-945 | 6.0 | 6.0 |
| TDI | 40.76 | 41.93 |
| WATER | 3.04 | 3.04 |
| L-650 | 1.0 | 1.0 |
| T-9 | 0.32 | 0.32 |
| TD-33 | 0.06 | 0.06 |
| RC-6366 | 0.245 | 0.265 |
| ACETONE | 4.40 | 4.40 |
| CP-2 | 11.5 | 11.5 |

TABLE 18.4

| | Formulation 4 | |
|---|---|---|
| Foam Properties | Formulation 4 (Control) | Formulation 4 (25%) |
| Density (lbs/ft$^3$) | 1.45 | 1.45 |
| Hardness (lbs) | 46 | 46 |
| Cal 117 Formulation | Yes | Yes |
| Ingredients | (PPH) | (PPH) |
| F-3020 | 78.5 | 53.5 |
| OLIG. POLYOL | 0 | 25.0 |
| P-4600 | 16 | 16 |
| MELAMINE | 5.5 | 5.5 |
| P-945 | 5.5 | 5.5 |
| TDI | 62.25 | 63.5 |
| WATER | 4.79 | 4.79 |
| L-650 | 0.9 | 0.9 |
| T-9 | 0.185 | 0.185 |
| TD-33 | 0.026 | 0.026 |
| RC-6366 | 0.175 | 0.175 |
| FR-550 | 12 | 12 |

Skin Density Measurement:

Skin densities were measured by cutting a 12"×12"×~1" piece of skin (i.e., foam located on the outer portion of the bun) from representative slabstock foam buns prepared using a full-scale conventional slabstock foam line using the polyurethane formulations are listed in TABLES 18.1-18.4. The height, width, and weight of each sample was measured and recorded. The thickness of each sample was measured by taking 5 to 9 measurements with a caliper. The measurement locations were distributed throughout the sample to ensure a representative average. Measurements were taken at consistent locations from sample to sample. The surface area, average thickness, and mass measurements were used to calculate an average density for each foam skin sample. A lower average density indicated that the sample had a lower density skin. This is associated with a thinner skin which results in a higher yield of prime foam from the slabstock foam bun. The results are reported in TABLE 18.5.

TABLE 18.5

| Example No. | Formulation | Density (lb/ft$^3$) | Skin Location |
|---|---|---|---|
| Comp. Ex. 18-A | Form 1 (Control) | 3.36 | Top |
| Example 18-1 | Form 1 (25%) | 2.60 | Top |
| Comp. Ex. 18-B | Form 1 (Control) | 3.26 | Bottom |
| Example 18-2 | Form 1 (25%) | 3.14 | Bottom |
| Example 18-3 | Form 1 (25%) | 3.36 | Bottom |
| Example 18-4 | Form 1 (25%) | 3.10 | Bottom |
| Example 18-5 | Form 1 (25%) | 2.93 | Bottom |
| Comp. Ex. 18-C | Form 2 (Control) | 3.94 | Bottom |
| Example 18-6 | Form 2 (15%) | 2.99 | Bottom |
| Example 18-7 | Form 2 (15%) | 2.91 | Bottom |
| Example 18-8 | Form 2 (25%) | 3.04 | Bottom |
| Example 18-9 | Form 2 (25%) | 2.95 | Bottom |
| Example 18-10 | Form 2 (25%) | 3.10 | Bottom |
| Example 18-11 | Form 2 (25%) | 2.93 | Bottom |
| Comp. Ex. 18-D | Form 3 (Control) | 3.43 | Top |
| Example 18-12 | Form 3 (25%) | 3.08 | Top |
| Example 18-13 | Form 3 (25%) | 2.67 | Top |
| Example 18-14 | Form 3 (25%) | 2.80 | Top |
| Example 18-15 | Form 3 (25%) | 2.34 | Top |
| Comp. Ex. 18-E | Form 3 (Control) | 2.98 | Bottom |
| Example 18-16 | Form 3 (25%) | 2.69 | Bottom |
| Comp. Ex. 18-F | Form 4 (Control) | 2.69 | Top |
| Example 18-17 | Form 4 (25%) | 2.59 | Top |

Example 19

IFD and Density Spread.

Buns of a 1.45/31 grade slabstock foam were prepared using full-scale slabstock foam line. The formulations of the foam are listed in TABLE 18.2. From each bun, eleven (11) test blocks (each measuring 15" by 15" by 4") were cut from the cross-section of the bun. The test blocks were numbered and labeled, with either an "M" (indicating middle of the bun) or "S" (indicating side of the bun). Each of the test blocks was tested to determined 25% and 65% IFD and density. ASTM test procedure D3574 was used, except that the tests were conducted 24 hours after making the bun. The results are reported in TABLE 19.1.

TABLE 19.1

| Formulation 2 | Control | 15% | 15% | 15% | 25% | 25% | 25% | 25% | 25% | 15% |
|---|---|---|---|---|---|---|---|---|---|---|
| Property | Mid | Mid | Side | Side | Mid | Side | Side | Mid | Side | Side |
| 25% IFD | 32.49 | 30.76 | 30.65 | 30.92 | 29.52 | 28.75 | 28.68 | 29.60 | 29.08 | 29.21 |
| 65% IFD | 59.87 | 57.78 | 57.60 | 57.70 | 54.70 | 54.00 | 54.70 | 57.10 | 55.10 | 57.10 |
| 25% RT | 22.05 | 20.90 | 21.20 | 21.20 | 19.30 | 19.10 | 19.10 | 19.50 | 19.10 | 19.40 |
| IFD Spread | 4.20 | 2.67 | 1.96 | 1.67 | 3.15 | 2.08 | 2.27 | 2.82 | 1.45 | 1.67 |
| S-Avg. Ov-All | | 2.10 | | 1.82 | 2.50 | | 2.18 | 1.98 | | 1.56 |
| Density | 1.46 | 1.43 | 1.42 | 1.43 | 1.39 | 1.39 | 1.39 | 1.40 | 1.40 | 1.40 |
| Density Spread | 0.09 | 0.06 | 0.06 | 0.05 | 0.05 | 0.06 | 0.03 | 0.05 | 0.02 | 0.05 |
| Modulus | 1.84 | 1.84 | 1.80 | 1.81 | 1.82 | 1.80 | 1.82 | 1.92 | 1.84 | 1.90 |
| Air Flow | 5.2 | 4.8 | 4.8 | 4.8 | 5.0 | 4.9 | 5.1 | 4.9 | 5.1 | 4.9 |
| Rebound | 46 | 41 | 40 | 42 | 38 | 39 | 40 | 40 | 39 | 40 |
| Hysterersis | 67.0 | 66.3 | 66.5 | 66.7 | 64.1 | 63.6 | 63.7 | 65.4 | 63.7 | 64.6 |

Example 20

Buns of flexible slabstock foam were prepared using a full-scale slabstock foam line. The formulations of the foam are listed in TABLE 18.1-18.4. The foam was tested for 5% IFD using ASTM D3574 (modified for 5% indentation). The results are reported in TABLES 20.2 to 20.4.

TABLE 20.2

|  | Frm 2 (15%) | Frm 2 (15%) | Frm 2 (25%) | Frm 2 (25%) | Frm 2 (25%) | Frm 2-Control | Frm 2 (25%) | Frm 2-Control |
|---|---|---|---|---|---|---|---|---|
| 5% IFD (N/323 cm²) | 20.09 | 18.93 | 18.54 | 18.08 | 18.60 | 20.79 | 17.82 | 19.37 |
|  | 21.04 | 20.35 | 20.05 | 19.71 | 19.90 | 21.40 | 19.55 | 21.77 |
|  | 21.13 | 20.68 | 20.28 | 19.84 | 20.04 | 22.00 | 19.87 | 21.81 |
|  | 21.04 | 20.93 | 20.27 | 20.07 | 19.90 | 22.24 | 19.60 | 22.13 |
|  | 21.08 | 20.61 | 19.97 | 19.98 | 19.81 | 22.09 | 19.30 | 22.00 |
|  | 20.71 | 20.49 | 20.05 | 19.99 | 19.76 | 22.09 | 19.30 | 22.31 |
|  | 20.63 | 20.50 | 19.92 | 20.08 | 19.68 | 21.86 | 19.38 | 21.90 |
|  | 20.38 | 20.68 | 20.13 | 20.22 | 19.80 | 21.67 | 19.45 | 22.04 |
|  | 20.52 | 20.87 | 20.04 | 20.03 | 19.99 | 21.72 | 19.78 | 22.07 |
|  | 19.55 | 20.05 | 19.92 | 19.96 | 19.77 | 21.75 | 19.61 | 21.87 |
|  | — | — | 18.61 | 18.54 | 18.98 | 21.02 | 18.72 | 20.66 |
| 5% IFD Ave | 20.62 | 20.41 | 19.80 | 19.68 | 19.66 | 21.69 | 19.31 | 21.63 |
| 5% IFD Spread | 1.58 | 2.00 | 1.74 | 2.14 | 1.44 | 1.45 | 2.05 | 2.94 |

Average 5% IFD of Formulation 2=19.91
Average 5% IFD of Formulation 2 (Control)=21.66
5% Change=8.08%

TABLE 20.3

|  | Frm 4 (25%) | Frm 4 (25%) | Frm 4 (25%) | Frm 4-Control | Frm 3-(25%) | Frm 3-(25%) | Frm 3 Control | Frm 3-Control |
|---|---|---|---|---|---|---|---|---|
| 5% IFD (N/323 cm²) | 27.56 | 29.13 | 27.02 | 28.68 | 16.33 | 16.08 | 16.40 | 16.18 |
|  | 27.68 | 29.52 | 27.96 | 29.46 | 17.31 | 16.83 | 17.15 | 17.08 |
|  | 29.50 | 31.03 | 29.91 | 31.38 | 17.39 | 17.06 | 17.46 | 17.42 |
|  | 30.79 | 31.98 | 31.06 | 31.76 | 17.38 | 17.16 | 17.34 | 17.43 |
|  | 31.34 | 32.95 | 31.21 | 31.54 | 17.22 | 16.97 | 17.28 | 17.33 |
|  | 30.94 | 32.36 | 31.65 | 31.76 | 17.01 | 16.98 | 17.22 | 17.27 |
|  | 30.21 | 32.24 | 30.82 | 31.21 | 16.75 | 16.60 | 17.09 | 17.17 |
|  | 29.81 | 32.47 | 30.68 | 31.69 | 16.55 | 16.13 | 16.68 | 16.78 |
|  | 29.19 | 31.82 | 29.82 | 31.77 | 15.79 | 15.66 | 16.48 | 16.27 |
|  | 28.20 | 30.53 | 28.88 | 31.09 | 15.09 | 14.87 | 15.03 | 15.25 |
|  | 26.80 | 28.41 | 27.46 | 28.80 |  |  |  |  |
| 5% IFD AVE | 29.28 | 31.13 | 29.68 | 30.83 | 16.68 | 16.44 | 16.81 | 16.82 |
| 5% IFD SPREAD | 4.53 | 4.54 | 4.63 | 3.09 | 2.30 | 2.29 | 2.43 | 2.18 |

Average 5% IFD of Formulation 4=29.84
Average 5% IFD of Formulation 4 (Control)=30.98
5% Change=4.85%
Average 5% IFD of Formulation 3=16.56
Average 5% IFD of Formulation 3—Control=16.81
% Change=1.52%

TABLE 20.4

|  | Frm 1 (25%) | Frm 1 (25%) | Frm 1-Control | Frm 1-Control |
|---|---|---|---|---|
| 5% IFD (N/323 cm²) | 17.56 | 17.49 | 18.65 | 18.72 |
|  | 18.75 | 18.96 | 19.76 | 20.28 |
|  | 19.08 | 19.19 | 19.98 | 20.53 |
|  | 19.16 | 19.12 | 19.91 | 20.69 |
|  | 19.20 | 19.11 | 20.07 | 20.67 |
|  | 19.11 | 18.79 | 20.01 | 20.40 |
|  | 18.99 | 18.79 | 20.12 | 20.19 |
|  | 18.78 | 18.40 | 19.85 | 20.07 |
|  | 18.64 | 18.29 | 19.76 | 19.63 |
|  | 17.93 | 17.35 | 18.17 | 17.78 |
| 5% IFD AVE | 18.72 | 18.55 | 19.63 | 19.90 |
| 5% IFD SPREAD | 1.65 | 1.83 | 1.95 | 2.91 |

Average 5% IFD Formulation 1=18.63
Average 5% IFD Formulation 1−Control=19.76
% Change=5.71%

Example 21

Support Factor

Flexible slabstock polyurethane foams having the formulations listed in TABLE 21.1 were prepared using the polyols listed in TABLE 21.2. The resulting foam samples were tested according to ASTM D3574 to provide 25% IFD and 65% IFD values. The support factor was calculated from the 25% and 65% IFD and is reported in TABLE 21.3.

TABLE 21.1

| Ingredient | 30% (PPH) | 40% (PPH) | 50% (PPH) |
|---|---|---|---|
| 3000 $M_W$ triol | 70 | 60 | 50 |
| Oligomeric. Polyol (see, Table 21.2) | 30 | 40 | 50 |
| Water | 4 | 4 | 4 |
| TDI | 105 index* | 105 index* | 105 index* |
| Surfactant | 1 | 1 | 1 |
| BL-11 (amine catalyst) | 0.16 | 0.16 | 0.16 |
| K-29 (stannous octoate) | 0.22 | 0.22 | 0.22 |

*The amount of TDI used was calculated based on the total water and the hydroxyl number of the polyol to provide an index of 105.

TABLE 21.2

| Polyol | OH Number | Acid Value | Water (%) | Mn (VPO) (grams/mole) | Fn (VPO) | Mn (LS) (grams/mole) | Mw (LS) (grams/mole) | Mw/Mn |
|---|---|---|---|---|---|---|---|---|
| 21-1 | 55.63 | 0.30 | 0.03 | 1695 | 1.68 | 1611 | 6928 | 4.30 |
| 21-2 | 58.81 | 0.28 | 0.04 | 1784 | 1.87 | 1567 | 9294 | 5.93 |
| 21-3 | 62.56 | 0.44 | 0.09 | 1844 | 2.06 | 3206 | 32180 | 10.04 |
| 21-4 | 63.23 | 0.44 | 0.08 | 1730 | 1.95 | 2887 | 26530 | 9.19 |
| 21-5 | 59.61 | 0.42 | 0.09 | 1664 | 1.77 | 2663 | 25570 | 9.60 |
| 21-6 | 58.97 | 0.43 | 0.05 | 1664 | 1.75 | 3300 | 42710 | 13.00 |
| 21-7 | 61.18 | 0.46 | 0.05 | 1822 | 1.99 | 3916 | 37820 | 10.59 |
| 21-8 | 65.85 | 0.43 | 0.07 | 1931 | 2.27 | 1864 | 11100 | 6.60 |
| 21-9 | 62.07 | 0.42 | 0.07 | 1744 | 1.93 | 3662 | 43920 | 12.00 |
| 21-10 | 65.12 | 0.43 | 0.06 | 1889 | 2.19 | 4502 | 51880 | 11.52 |
| 21-11 | 64.76 | 0.47 | 0.06 | 1981 | 2.29 | 1739 | 13110 | 7.54 |
| 21-12 | 63.51 | 0.32 | 0.06 | 1691 | 1.91 | 1760 | 6649 | 3.78 |
| 21-13 | 55.81 | 0.26 | 0.07 | 1897 | 1.89 | 1501 | 8251 | 5.50 |
| 21-14 | 54.50 | 0.25 | 0.05 | 1971 | 1.91 | 1433 | 7763 | 5.42 |
| 21-15 | 59.52 | 0.30 | 0.07 | 1864 | 1.98 | 1674 | 8345 | 4.98 |
| 21-16 | 59.28 | 0.32 | 0.05 | 1980 | 2.09 | 1670 | 12130 | 7.27 |
| 21-17 | 60.94 | 0.22 | 0.05 | 1857 | 2.02 | 1623 | 11440 | 7.05 |
| 21-18 | 57.99 | 0.27 | 0.05 | 1704 | 1.76 | 1615 | 8055 | 4.99 |
| 21-19 | 56.91 | 0.30 | 0.04 | 1596 | 1.62 | 1442 | 7412 | 5.14 |
| 21-20 | 56.43 | 0.26 | 0.04 | 1670 | 1.68 | 1512 | 7799 | 5.13 |
| 21-21 | 60.18 | 0.42 | 0.05 | 1828 | 1.96 | 1405 | 8373 | 5.96 |
| 21-22 | 57.45 | 0.34 | 0.05 | 1728 | 1.77 | 1710 | 8626 | 5.04 |

| Polyol | g'M | Viscosity (Pa·s) | PV (%) | Mon (GPC) | Dim | Trim | Tetr+ | EOC (%) | Oligomer (% wt) |
|---|---|---|---|---|---|---|---|---|---|
| 21-1 | 1.27 | 3.28 | 1.5 | 43.9 | 11.7 | 7.9 | 36.5 | 4.38 | 56.1 |
| 21-2 | 1.11 | 4.73 | 1.9 | 39.9 | 11.2 | 7.3 | 41.6 | 4.21 | 60.1 |
| 21-3 | 0.53 | 4.65 | 3.9 | 41.7 | 11.5 | 7.5 | 39.3 | 4.22 | 58.3 |
| 21-4 | 0.58 | 5.42 | 2.5 | 39.8 | 11.7 | 7.7 | 40.8 | 4.13 | 60.2 |
| 21-5 | 0.52 | 4.03 | 2.7 | 43.3 | 11.9 | 7.6 | 37.2 | 4.31 | 56.7 |
| 21-6 | 0.37 | 4.99 | 2.7 | 45.1 | 11.5 | 7.4 | 35.4 | 4.18 | 54.9 |
| 21-7 | 0.45 | 6.18 | 2.2 | 38.9 | 11.2 | 7.3 | 42.4 | 3.98 | 61.1 |
| 21-8 | 1.01 | 4.03 | 2.7 | 39.0 | 11.5 | 7.4 | 42.1 | 4.20 | 61.0 |
| 21-9 | 0.39 | 4.94 | 2.8 | 41.8 | 11.2 | 7.4 | 39.6 | 4.03 | 58.2 |
| 21-10 | 0.37 | 7.59 | 3.5 | 38.6 | 10.6 | 6.8 | 44.0 | 4.05 | 61.4 |
| 21-11 | 0.93 | 6.56 | 3.3 | 37.8 | 11.3 | 7.0 | 43.9 | 3.96 | 62.2 |
| 21-12 | 1.37 | 3.41 | 2.2 | 43.8 | 12.2 | 8.1 | 35.9 | 4.08 | 56.2 |
| 21-13 | 1.49 | 3.33 | 2.3 | 43.7 | 10.7 | 6.7 | 38.9 | 4.27 | 56.4 |
| 21-14 | 1.26 | 3.13 | 2.5 | 43.7 | 11.1 | 7.3 | 37.9 | 4.46 | 56.3 |
| 21-15 | 1.17 | 2.95 | 2.2 | 41.4 | 11.4 | 7.5 | 39.7 | 4.49 | 58.6 |
| 21-16 | 0.98 | 5.25 | 2.3 | 40.2 | 10.5 | 6.8 | 42.4 | 4.39 | 59.8 |
| 21-17 | 1.03 | 5.22 | 2.0 | 40.1 | 10.9 | 7.2 | 41.8 | 4.14 | 59.9 |
| 21-18 | 1.24 | 3.73 | 1.9 | 42.3 | 11.0 | 7.73 | 39.0 | 4.37 | 57.7 |
| 21-19 | 1.22 | 3.51 | 1.7 | 44.2 | 11.0 | 7.44 | 37.9 | 4.37 | 55.8 |
| 21-20 | 1.25 | 3.46 | 2.0 | 43.8 | 10.8 | 7.12 | 38.3 | 4.40 | 56.2 |
| 21-21 | 1.25 | 4.00 | 2.5 | 41.2 | 11.4 | 7.5 | 39.8 | 4.25 | 58.8 |
| 21-22 | 1.26 | 3.57 | 2.0 | 42.3 | 11.2 | 7.5 | 39.0 | 4.33 | 57.7 |

TABLE 21.3

Support Factor at 30%, 40%, and 50% Incorporation

| Sample (Polyol No.) | Support Factor @ 30% | Support Factor @ 40% | Support Factor @ 50% |
|---|---|---|---|
| 21-1 | 1.86 | 1.89 | — |
| 21-2 | 1.81 | 1.865 | 2.19 |
| 21-3 | 1.83 | 1.91 | — |
| 21-4 | 1.81 | 1.98 | 1.98 |
| 21-5 | 1.83 | 1.94 | — |
| 21-6 | 1.82 | 1.815 | — |
| 21-7 | 1.76 | 1.985 | 1.99 |
| 21-8 | 1.96 | 2.015 | 2.02 |
| 21-9 | 1.79 | 1.865 | — |
| 21-10 | 1.80 | 2.15 | 2.15 |
| 21-11 | 1.80 | 2.075 | 2.08 |
| 21-12 | 1.85 | 1.945 | 1.95 |
| 21-13 | 1.84 | 1.86 | 2.18 |
| 21-14 | 1.77 | 1.85 | — |

TABLE 21.3-continued

Support Factor at 30%, 40%, and 50% Incorporation

| Sample (Polyol No.) | Support Factor @ 30% | Support Factor @ 40% | Support Factor @ 50% |
|---|---|---|---|
| 21-15 | 1.82 | 1.99 | 1.99 |
| 21-16 | 1.80 | 1.92 | 1.95 |
| 21-17 | 1.79 | 1.9 | 1.95 |
| 21-18 | 1.80 | 1.91 | 2.14 |
| 21-19 | 1.82 | 1.84 | 2.06 |
| 21-20 | 1.845 | 1.93 | 2.13 |
| 21-21 | 1.82 | 1.85 | 2.03 |
| 21-22 | 1.84 | 1.90 | 2.19 |
| AVE. | 1.818 | 1.927 | 2.059 |

Example 22

Flame Retardance

Slabstock foam samples prepared in Example 18 were tested for flame retardance in accordance with Technical Bulletin 117, "Requirements, Test Procedure and Apparatus for Testing the Flame Retardance of Resilient Filling Materials Used in Upholstered Furniture" (March 2000). The results are reported in TABLE 22.1.

TABLE 22.1

| | Form. 4-Control | Form. 4 (25%) | Form. 3-Control | Form. 3 (25%) | Form. 1-Control | Form. 1 (25%) |
|---|---|---|---|---|---|---|
| Smolder % (Ave.) | 99.3 | 99.3 | 99.2 | 98.2 | 83.6 | 94.9 |
| Char Length (Ave.) | 1.58 | 1.58 | 1.88 | 1.62 | 1.44 | 1.34 |
| Aged Char Length (Ave.) | 1.54 | 1.54 | 1.82 | 1.64 | 1.26 | 0.96 |

Example 23

An oligomeric polyol was fractionated with multiple GPC column runs. For each fraction, phenyl isocyanate was used to tag the OH groups in the fraction. The ultraviolet absorbance of each fraction was then measured to determine hydroxyl content. By comparison with a standard, hydroxyl number and number average hydroxyl functionality (Fn) for each fraction were determined. The results are present in TABLE 23.1.

TABLE 23.1

| | | GPC Fraction | | | | | |
|---|---|---|---|---|---|---|---|
| | Ave | 1 | 2 | 3 | 4 | 5 | 6 |
| Fn | 1.34 | 0.51 | 1.45 | 2.00 | 4.00 | 4.81 | 11.68 |
| Mn (grams/mole) | 1760 | 974 | 1944 | 2916 | 4860 | 6818 | 13608 |
| mole % | 100.0 | 42.0 | 13.9 | 9.3 | 10.0 | 18.7 | 5.2 |

Example 24

An oligomeric polyol having the characteristic shown in TABLE 24.1 was analyzed for the presence of odor-producing lipid oxidation products hexanal, nonanal, and decanal. The analytical technique used solid phase micro-extraction followed by gas chromatography and flame ionization detection in order to determine the level of the oxidation products in the oligomeric polyol in parts per million (ppm). External standards were used to construct calibration curves for hexanal, nonanal, and decanal. The results of the analysis on the oligomeric polyol of TABLE 24.1 are shown in TABLE 24.2.

TABLE 24.1

| Property | Value |
|---|---|
| Hydroxy Number | 57.6 |
| Monomer (%) | 41.6 |
| Dimer (%) | 11.5 |
| Trimer (%) | 7.3 |
| Tetra+ (%) | 39.6 |
| Total Olig (%) | 58.4 |
| Viscosity (Pa · s) | 3.88 |

TABLE 24.2

| Compound | Amount of Compound (ppm) |
|---|---|
| Hexanal | 10.40 |
| Nonanal | 13.78 |
| Decanal | 1.17 |
| Total | 25.34 |

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A polyurethane foam comprising the reaction product of:
   (a) a polyisocyanate; and
   (b) an active-hydrogen containing composition comprising an oligomeric polyol having a hydroxyl number of about 45 to about 65 mg KOH/g, a number average hydroxyl functionality of less than about 2.7, and from about 55% to about 65% weight oligomers.

2. A polyurethane foam comprising the reaction product of:
   (a) a polyisocyanate; and (b) an active-hydrogen containing composition comprising an oligomeric polyol having a hydroxyl number of about 45 to about 65 mg KOH/g, a number average hydroxyl functionality of less than about 2.7, and about 40% weight or greater oligomers, wherein the oligomeric polyol has about 8% to about 12% weight dimers, about 5% to about 10% weight trimers, and about 35% weight or greater higher order oligomers.

3. The polyurethane foam of claim 1, wherein the oligomeric polyol has a number average hydroxyl functionality less than about 2.5.

4. The polyurethane foam of claim 1 or 2, wherein the oligomeric polyol has a number average hydroxyl functionality less than about 2.0.

5. The polyurethane foam of claim 1, wherein the oligomeric polyol has an acid value that is less than about 1.0 mg KOH/gram.

6. The polyurethane foam of claim 1, wherein the oligomeric polyol has a number average molecular weight (Mn) of about 1000 to 5000 grams/mole.

7. The polyurethane foam of claim 1, wherein the oligomeric polyol has a weight average molecular weight (Mw) of about 5000 to 50,000 grams/mole.

8. The polyurethane foam of claim 1, wherein the oligomeric polyol has a viscosity of about 0.5 to about 10 Pa·s at 25° C.

9. The polyurethane foam of claim 1, wherein the oligomeric polyol has a residual epoxy oxygen content of about 0.5% to about 5.0%.

10. The polyurethane foam of claim 1, wherein the oligomeric polyol has a residual epoxy oxygen content of about 0.01% to about 5.0%.

11. The polyurethane foam of claim 1, wherein the oligomeric polyol is made from an epoxidized natural oil.

12. The polyurethane foam of claim 11, wherein the natural oil is selected from soybean oil, safflower oil, linseed oil, corn oil, sunflower oil, olive oil, canola oil, sesame oil, cottonseed oil, palm-based oil, rapeseed oil, tung oil, peanut oil, fish oil, lard, tallow, and combinations thereof.

13. The polyurethane foam of claim 12, wherein the natural oil comprises soybean oil.

14. The polyurethane foam of claim 12, wherein the palm-based oil comprises palm-olein.

15. The polyurethane foam of claim 1, wherein the active-hydrogen containing composition further comprises a petroleum-derived polyol.

16. The polyurethane foam of claim 15, wherein the petroleum-derived polyol is a triol.

17. The polyurethane foam of claim 15, wherein the petroleum-derived triol has a molecular weight of about 3000 grams/mole.

18. The polyurethane foam of claim 15, wherein the active-hydrogen containing composition comprises about 45% to about 90% weight petroleum-derived polyol and about 10% to about 60% weight oligomeric polyol.

19. The polyurethane foam of claim 1, wherein the polyisocyanate is toluene diisocyanate, 4,4'-diphenylmethane diisocyanate, polymeric 4,4'-diphenylmethane, or a mixture thereof.

20. The polyurethane foam of claim 1, wherein the active-hydrogen containing composition comprises about 10% to about 50% weight of the oligomeric polyol.

21. The polyurethane foam of claim 1, wherein the polyurethane foam is a slabstock foam.

22. The polyurethane foam of claim 21, wherein the polyurethane foam is flexible slabstock foam.

23. The polyurethane foam of claim 1, wherein the polyurethane foam is a molded foam.

24. The polyurethane foam of claim 1, wherein the polyurethane foam has a density of about 0.5 to about 5.0 lbs/ft$^3$.

25. The polyurethane foam of claim 1, wherein the wherein the active hydrogen-containing composition comprises at least 10 PPH oligomeric polyol, and wherein the polyurethane foam exhibits a percent tensile strength reduction relative to a control formulation that is less than or equal to formula (I):

$$\text{percent tensile strength reduction}=0.89\times(\text{PPH oligomeric polyol}) \quad (I)$$

for polyurethane foam having a density of about 1.5 lb/ft$^3$ and a 25% IFD of about 23 N/323 cm$^2$.

26. The polyurethane foam of claim 25, wherein formula (I) equals:

$$\text{percent tensile strength reduction}=1.0\times(\text{PPH oligomeric polyol}) \quad (I).$$

27. The polyurethane foam of claim 1, wherein the active hydrogen-containing composition comprises at least 10 PPH oligomeric polyol, and wherein the polyurethane foam exhibits a tear strength reduction relative to a control formulation that is less than or equal to formula (II):

$$\text{percent tear strength reduction}=1.40\times(\text{PPH of oligomeric polyol}) \quad (II)$$

for polyurethane foam having a density of about 1.5 lb/ft$^3$ and a 25% IFD of about 23 N/323 cm$^2$.

28. The polyurethane foam of claim 1, wherein the active-hydrogen containing composition comprises at least 10 PPH oligomeric polyol, and wherein the polyurethane foam exhibits a percent elongation reduction that is less than or equal to formula (III):

$$\text{percent elongation reduction}=1.36\times(\text{PPH of oligomeric polyol}) \quad (III)$$

for polyurethane foam having a density of about 1.5 lb/ft$^3$ and a 25% IFD of about 23 N/323 cm$^2$.

29. The polyurethane foam of claim 1, wherein the polyurethane foam is in the form of a slabstock foam bun having a high density outer skin layer comprising an outer one inch of the foam, and wherein the density of the outer skin layer is at least about 20% less than a high density outer skin layer of a polyurethane foam bun comprising a control formulation.

30. The polyurethane foam of claim 29, wherein the density of the slabstock polyurethane foam is less than the density of the slabstock foam comprising the control formulation by about 0.25lb/ft$^3$ or greater.

31. A polyurethane foam of claim 1, wherein the polyurethane foam has an increased support factor as compared to a polyurethane foam comprising a control formulation.

32. The polyurethane foam of claim 31, wherein the support factor ranges from about 1.7 to about 2.2.

33. The polyurethane foam of claim 1, wherein the polyurethane foam has improved hand touch as compared to a polyurethane foam comprising a control formulation.

34. The polyurethane foam of claim 33, wherein the polyurethane foam has a 5% IFD that is reduced by about 2% or greater as compared to the control formulation.

35. The polyurethane foam of claim 33, wherein the polyurethane foam has a 5% IFD that is reduced by about 5% or greater as compared to the control formulation.

36. The polyurethane foam of claim 1, wherein the polyurethane foam has improved flame retardancy as compared to a polyurethane foam comprising a control formulation.

37. The polyurethane foam of claim 36, wherein the polyurethane foam has a reduced char length as compared to the control formulation.

38. The polyurethane foam of claim 1, wherein the polyurethane foam has improved water resistance as compared to a polyurethane foam comprising a control formulation.

39. The polyurethane foam of claim 1, wherein the polyurethane foam has a reduced 5% IFD as compared to a polyurethane foam comprising a control formulation.

40. The polyurethane foam of claim 1, wherein the polyurethane foam has a reduced 5% IFD and a substantially equal 25% IFD as compared to a polyurethane foam comprising a control formulation.

41. The polyurethane foam of claim 1, wherein the oligomeric polyol is prepared by a process comprising:
(a) providing an epoxidized natural oil; and
(b) combining the epoxidized natural oil with an ring-opening alcohol and a catalytic amount of ring-opening catalyst to form the oligomeric polyol.

42. The polyurethane foam of claim 41, wherein the ring-opening alcohol is a monohydric alcohol.

43. The polyurethane foam of claim 42, wherein the monohydric alcohol is methanol.

44. The polyurethane foam of claim 41, wherein the ring-opening alcohol is a polyol.

45. The polyurethane foam of claim 44, wherein the polyol is ethylene glycol, propylene glycol, 1,3-propanediol, butylene glycol, 1,4-butane-diol, 1,5-pentanediol, 1,6-hexanediol, polyethylene glycol, polypropylene glycol, a vegetable oil-based polyol, or a mixture thereof.

46. The polyurethane foam of claim 1, wherein the oligomeric polyol comprises about 30 ppm or less hexanal.

47. The polyurethane foam of claim 1, wherein the oligomeric polyol comprises about 30 ppm or less nonanal.

48. The polyurethane foam of claim 1, wherein the oligomeric polyol comprises about 30 ppm or less decanal.

49. The polyurethane foam of claim 1, wherein the oligomeric polyol comprises about 70 ppm or less total hexanal, nonanal, and decanal.

* * * * *